US009925950B2

(12) United States Patent
Moeller et al.

(10) Patent No.: US 9,925,950 B2
(45) Date of Patent: Mar. 27, 2018

(54) ACTIVE AIRBAG VENT SYSTEM

(71) Applicant: AmSafe, Inc., Phoenix, AZ (US)

(72) Inventors: Trenton Dirk Moeller, Mesa, AZ (US); Daniel Nick Foubert, Maricopa, AZ (US); Todd Joseph Humbert, Chandler, AZ (US); Peter Anthony Settles, Maricopa, AZ (US); Ronald A. Shields, Mesa, AZ (US)

(73) Assignee: AmSafe, Inc., Phoenix, AZ (US)

( * ) Notice: Subject to any disclaimer, the term of this patent is extended or adjusted under 35 U.S.C. 154(b) by 0 days.

(21) Appl. No.: 15/096,158

(22) Filed: Apr. 11, 2016

(65) Prior Publication Data

US 2016/0297396 A1    Oct. 13, 2016

Related U.S. Application Data

(60) Provisional application No. 62/146,268, filed on Apr. 11, 2015.

(51) Int. Cl.
| *B60R 21/18* | (2006.01) |
| *B60R 21/2342* | (2011.01) |
| *B60R 21/233* | (2006.01) |
| *B60R 21/239* | (2006.01) |
| *B60R 21/263* | (2011.01) |

(Continued)

(52) U.S. Cl.
CPC ............ *B60R 21/263* (2013.01); *B60R 21/18* (2013.01); *B60R 21/233* (2013.01); *B60R 21/239* (2013.01); *B60R 21/2342* (2013.01); *B64D 25/00* (2013.01); *B60R 2021/01231* (2013.01);

(Continued)

(58) Field of Classification Search
CPC .. B60R 2021/0093; B60R 2021/01231; B60R 2021/2395; B60R 2021/23324; B60R 2021/23332; B60R 2021/26058; B60R 21/18; B60R 21/233; B60R 21/239;

(Continued)

(56) References Cited

U.S. PATENT DOCUMENTS

| 2,502,206 A | 3/1950 | Creek |
| 3,430,979 A | 3/1969 | Terry et al. |

(Continued)

FOREIGN PATENT DOCUMENTS

| CN | 1351710 A | 5/2002 |
| CN | 1750966 A | 3/2006 |

(Continued)

OTHER PUBLICATIONS

International Search Report and Written Opinion dated Jul. 15, 2016; International Application No. PCT/US2016/026987; 8 pages.

(Continued)

*Primary Examiner* — Laura Freedman
(74) *Attorney, Agent, or Firm* — Perkins Coie LLP

(57) ABSTRACT

Active airbag vent systems and associated systems and methods are described herein. An airbag system having an active vent configured in accordance with an embodiment of the present technology can include, for example, a first inflator operably coupled to a first hose for inflating an airbag in response to a rapid deceleration event. The airbag system can further include a second inflator operably coupled to a second hose configured to release a vent or seam on the airbag to rapidly deflate the airbag after initial deployment of the airbag.

14 Claims, 11 Drawing Sheets

(51) Int. Cl.
*B64D 25/00* (2006.01)
*B60R 21/01* (2006.01)

(52) U.S. Cl.
CPC .............. *B60R 2021/2395* (2013.01); *B60R 2021/23324* (2013.01); *B64D 2201/00* (2013.01)

(58) Field of Classification Search
CPC .............. B60R 21/2342; B60R 21/263; B64D 2201/00; B64D 25/00
See application file for complete search history.

(56) References Cited

U.S. PATENT DOCUMENTS

| | | |
|---|---|---|
| 3,560,027 A | 2/1971 | Graham |
| 3,586,347 A | 6/1971 | Carey et al. |
| 3,603,535 A | 9/1971 | DePolo |
| 3,682,498 A | 8/1972 | Rutzki |
| 3,706,463 A | 12/1972 | Lipkin |
| 3,730,583 A | 5/1973 | Colovas et al. |
| 3,756,620 A | 9/1973 | Radke |
| 3,766,612 A | 10/1973 | Hattori |
| 3,801,156 A | 4/1974 | Granig |
| 3,820,842 A | 6/1974 | Stephenson |
| 3,841,654 A | 10/1974 | Lewis |
| 3,865,398 A | 2/1975 | Woll |
| 3,866,940 A | 2/1975 | Lewis |
| 3,888,503 A | 6/1975 | Hamilton |
| 3,888,505 A | 6/1975 | Shibamoto |
| 3,897,081 A | 7/1975 | Lewis |
| 3,905,615 A | 9/1975 | Schulman |
| 3,933,370 A | 1/1976 | Abe et al. |
| 3,948,541 A | 4/1976 | Schulman |
| 3,970,329 A | 7/1976 | Lewis |
| 3,971,569 A | 7/1976 | Abe et al. |
| 4,107,604 A | 8/1978 | Bernier |
| 4,261,535 A | 4/1981 | Swanson |
| 4,437,628 A | 3/1984 | Schwartz |
| 4,536,008 A | 8/1985 | Brown |
| 4,565,535 A | 1/1986 | Tassy |
| 4,611,491 A | 9/1986 | Brown et al. |
| 4,657,516 A | 4/1987 | Tassy |
| 4,722,573 A | 2/1988 | Komohara |
| 4,765,569 A | 8/1988 | Higgins |
| 4,842,299 A | 6/1989 | Okamura et al. |
| 4,971,354 A | 11/1990 | Kim |
| 4,987,783 A | 1/1991 | D'Antonio et al. |
| 4,995,638 A | 2/1991 | Shinto et al. |
| 4,995,640 A | 2/1991 | Saito |
| 5,026,305 A | 6/1991 | Del Guidice et al. |
| 5,062,662 A | 11/1991 | Cameron |
| 5,062,663 A | 11/1991 | Satoh |
| 5,161,821 A | 11/1992 | Curtis |
| 5,162,006 A | 11/1992 | Yandle, II |
| 5,183,288 A | 2/1993 | Inada et al. |
| 5,184,844 A | 2/1993 | Goor |
| 5,194,755 A | 3/1993 | Rhee et al. |
| 5,199,739 A | 4/1993 | Fujiwara et al. |
| 5,246,250 A | 9/1993 | Wolanin et al. |
| 5,280,953 A | 1/1994 | Wolanin et al. |
| 5,288,104 A | 2/1994 | Chen |
| 5,299,827 A | 4/1994 | Igawa |
| 5,301,902 A | 4/1994 | Kalberer et al. |
| 5,324,071 A | 6/1994 | Gotomyo et al. |
| 5,335,937 A | 8/1994 | Uphues et al. |
| 5,335,939 A | 8/1994 | Kuriyama et al. |
| 5,344,210 A | 9/1994 | Marwan et al. |
| 5,375,875 A | 12/1994 | DiSalvo et al. |
| 5,400,867 A | 3/1995 | Muller et al. |
| 5,411,289 A | 5/1995 | Smith et al. |
| 5,447,327 A | 9/1995 | Jarboe et al. |
| 5,454,595 A | 10/1995 | Olson et al. |
| 5,456,491 A | 10/1995 | Chen et al. |
| 5,465,999 A | 11/1995 | Tanaka et al. |
| 5,470,103 A | 11/1995 | Vaillancourt et al. |
| 5,472,231 A | 12/1995 | France |
| 5,473,111 A | 12/1995 | Hattori et al. |
| 5,482,230 A | 1/1996 | Bird et al. |
| 5,485,041 A | 1/1996 | Meister |
| 5,492,360 A | 2/1996 | Logeman |
| 5,492,361 A | 2/1996 | Kim |
| 5,496,059 A | 3/1996 | Bauer |
| 5,499,840 A | 3/1996 | Nakano |
| 5,556,056 A | 9/1996 | Kalberer et al. |
| 5,558,300 A | 9/1996 | Kalberer et al. |
| 5,564,734 A | 10/1996 | Stuckle |
| 5,597,178 A | 1/1997 | Hardin, Jr. |
| 5,609,363 A | 3/1997 | Finelli |
| 5,630,616 A | 5/1997 | McPherson |
| 5,672,916 A | 9/1997 | Mattes et al. |
| 5,695,242 A | 12/1997 | Brantman et al. |
| 5,727,270 A | 3/1998 | Cope et al. |
| 5,734,318 A | 3/1998 | Nitschke et al. |
| 5,738,368 A | 4/1998 | Hammond et al. |
| 5,752,714 A | 5/1998 | Pripps et al. |
| 5,758,900 A | 6/1998 | Knoll et al. |
| 5,765,869 A | 6/1998 | Huber |
| 5,772,238 A | 6/1998 | Breed et al. |
| 5,802,479 A | 9/1998 | Kithil et al. |
| 5,803,489 A | 9/1998 | Nusshor |
| 5,839,753 A | 11/1998 | Yaniv et al. |
| 5,851,055 A | 12/1998 | Lewis |
| 5,863,065 A | 1/1999 | Boydston et al. |
| 5,868,421 A | 2/1999 | Eyrainer |
| 5,871,230 A | 2/1999 | Lewis |
| 5,871,231 A | 2/1999 | Richards et al. |
| 5,886,373 A | 3/1999 | Hosogi |
| 5,906,391 A | 5/1999 | Weir et al. |
| 5,911,434 A | 6/1999 | Townsend |
| 5,921,507 A | 7/1999 | Kalberer et al. |
| 5,924,726 A | 7/1999 | Pan |
| 5,927,748 A | 7/1999 | O'Driscoll |
| 5,927,754 A | 7/1999 | Patzelt et al. |
| 5,947,513 A | 9/1999 | Lehto |
| 5,975,565 A | 11/1999 | Cuevas |
| 5,984,350 A | 11/1999 | Hagan et al. |
| 5,988,438 A | 11/1999 | Lewis et al. |
| RE36,587 E | 2/2000 | Tanaka et al. |
| 6,019,388 A | 2/2000 | Okazaki et al. |
| 6,042,139 A | 3/2000 | Knox |
| RE36,661 E | 4/2000 | Tanaka et al. |
| 6,059,311 A | 5/2000 | Wipasuramonton et al. |
| 6,059,312 A | 5/2000 | Staub et al. |
| 6,065,772 A | 5/2000 | Yamamoto et al. |
| 6,082,763 A | 7/2000 | Kokeguchi |
| 6,113,132 A | 9/2000 | Saslecov |
| 6,126,194 A | 10/2000 | Yaniv et al. |
| 6,135,489 A | 10/2000 | Bowers |
| 6,142,508 A | 11/2000 | Lewis |
| 6,142,511 A | 11/2000 | Lewis |
| 6,149,231 A | 11/2000 | Wustholz |
| 6,155,595 A | 12/2000 | Schultz |
| 6,155,598 A | 12/2000 | Kutchey |
| 6,158,765 A | 12/2000 | Sinnhuber |
| 6,168,195 B1 | 1/2001 | Okazaki et al. |
| 6,173,988 B1 | 1/2001 | Igawa |
| 6,193,269 B1 | 2/2001 | Amamori |
| 6,199,900 B1 | 3/2001 | Zeigler et al. |
| 6,206,411 B1 | 3/2001 | Sunabashiri |
| 6,217,059 B1 | 4/2001 | Brown et al. |
| 6,224,097 B1 | 5/2001 | Lewis |
| 6,254,121 B1 | 7/2001 | Fowler et al. |
| 6,254,130 B1 | 7/2001 | Jayaraman et al. |
| 6,260,572 B1 | 7/2001 | Wu |
| 6,260,877 B1 * | 7/2001 | Rasmussen, Sr. .... B60R 21/203 280/729 |
| 6,276,714 B1 | 8/2001 | Yoshioka |
| 6,293,582 B1 | 9/2001 | Lewis |
| 6,325,412 B1 | 12/2001 | Pan |
| 6,336,657 B1 | 1/2002 | Akaba et al. |
| 6,378,896 B1 | 4/2002 | Sakakida et al. |
| 6,378,898 B1 | 4/2002 | Lewis et al. |
| 6,382,666 B1 | 5/2002 | Devonport |

(56) References Cited

U.S. PATENT DOCUMENTS

| | | |
|---|---|---|
| 6,390,502 B1 | 5/2002 | Ryan et al. |
| 6,398,254 B2 | 6/2002 | David et al. |
| 6,406,058 B1 | 6/2002 | Devonport et al. |
| 6,419,263 B1 | 7/2002 | Büsgen et al. |
| 6,422,512 B1 | 7/2002 | Lewis et al. |
| 6,425,601 B1 | 7/2002 | Lewis et al. |
| 6,439,600 B1 | 8/2002 | Adkisson |
| 6,442,807 B1 | 9/2002 | Adkisson |
| 6,443,496 B2 | 9/2002 | Campau et al. |
| 6,460,878 B2 | 10/2002 | Eckert et al. |
| 6,547,273 B2 | 4/2003 | Grace et al. |
| 6,557,887 B2 | 5/2003 | Wohllebe |
| 6,585,289 B1 | 7/2003 | Hammer et al. |
| 6,607,210 B2 | 8/2003 | Eckert et al. |
| 6,616,177 B2 | 9/2003 | Thomas et al. |
| 6,619,689 B2 | 9/2003 | Spencer et al. |
| 6,648,367 B2 | 11/2003 | Breed et al. |
| 6,669,229 B2 | 12/2003 | Thomas et al. |
| 6,682,141 B2 | 1/2004 | Coughren et al. |
| 6,688,642 B2 | 2/2004 | Sollars, Jr. |
| 6,705,641 B2 | 3/2004 | Schneider et al. |
| 6,715,788 B2 | 4/2004 | Saiguchi et al. |
| 6,729,643 B1 | 5/2004 | Bassick et al. |
| 6,739,264 B1 | 5/2004 | Hosey et al. |
| 6,746,074 B1 | 6/2004 | Kempf et al. |
| 6,749,220 B1 | 6/2004 | Wipasuramonton et al. |
| 6,758,489 B2 | 7/2004 | Xu |
| 6,764,097 B2 | 7/2004 | Kelley et al. |
| 6,769,714 B2 | 8/2004 | Hosey et al. |
| 6,773,030 B2 | 8/2004 | Fischer et al. |
| 6,776,434 B2 | 8/2004 | Ford et al. |
| 6,779,813 B2 | 8/2004 | Lincoln |
| 6,789,818 B2 | 9/2004 | Gioutsos et al. |
| 6,789,819 B1 | 9/2004 | Husby |
| 6,789,821 B2 | 9/2004 | Zink et al. |
| 6,793,243 B2 | 9/2004 | Husby |
| 6,796,578 B2 | 9/2004 | White et al. |
| 6,802,527 B2 | 10/2004 | Schmidt et al. |
| 6,802,530 B2 | 10/2004 | Wipasuramonton et al. |
| 6,808,198 B2 | 10/2004 | Schneider et al. |
| 6,823,645 B2 | 11/2004 | Ford |
| 6,824,163 B2 | 11/2004 | Sen et al. |
| 6,825,654 B2 | 11/2004 | Pettypiece, Jr. et al. |
| 6,830,263 B2 | 12/2004 | Xu et al. |
| 6,830,265 B2 | 12/2004 | Ford |
| 6,832,778 B2 | 12/2004 | Pinsenschaum et al. |
| 6,837,079 B1 | 1/2005 | Takeuchi |
| 6,838,870 B2 | 1/2005 | Pettypiece, Jr. et al. |
| 6,840,534 B2 | 1/2005 | Lincoln et al. |
| 6,840,537 B2 | 1/2005 | Xu et al. |
| 6,840,539 B2 | 1/2005 | Pettypiece, Jr. |
| 6,843,503 B2 | 1/2005 | Ford |
| 6,846,005 B2 | 1/2005 | Ford et al. |
| 6,851,374 B1 | 2/2005 | Kelley et al. |
| 6,857,657 B2 | 2/2005 | Canterberry et al. |
| 6,860,509 B2 | 3/2005 | Xu et al. |
| 6,863,298 B2 | 3/2005 | Sakai et al. |
| 6,863,301 B2 | 3/2005 | Ford et al. |
| 6,869,101 B2 | 3/2005 | White et al. |
| 6,871,872 B2 | 3/2005 | Thomas |
| 6,871,874 B2 | 3/2005 | Husby et al. |
| 6,874,812 B2 | 4/2005 | Keutz et al. |
| 6,874,814 B2 | 4/2005 | Hosey et al. |
| 6,877,771 B2 | 4/2005 | Weber |
| 6,882,914 B2 | 4/2005 | Gioutsos et al. |
| 6,886,856 B2 | 5/2005 | Canterberry et al. |
| 6,886,858 B2 | 5/2005 | Olson |
| 6,887,325 B2 | 5/2005 | Canterberry et al. |
| 6,894,483 B2 | 5/2005 | Pettypiece, Jr. et al. |
| 6,905,134 B2 | 6/2005 | Saiguchi et al. |
| 6,908,104 B2 | 6/2005 | Canterberry et al. |
| 6,923,483 B2 | 8/2005 | Curry et al. |
| 6,929,283 B2 | 8/2005 | Gioutsos et al. |
| 6,932,378 B2 | 8/2005 | Thomas |
| 6,932,385 B2 | 8/2005 | Hawthorn et al. |
| 6,935,684 B2 | 8/2005 | Sakai |
| 6,942,244 B2 | 9/2005 | Roychoudhury |
| 6,951,350 B2 | 10/2005 | Heidorn et al. |
| 6,951,532 B2 | 10/2005 | Ford |
| 6,953,204 B2 | 10/2005 | Xu et al. |
| 6,955,377 B2 | 10/2005 | Cooper et al. |
| 6,957,828 B2 | 10/2005 | Keeslar et al. |
| 6,962,363 B2 | 11/2005 | Wang et al. |
| 6,962,364 B2 | 11/2005 | Ju et al. |
| 6,966,576 B1 | 11/2005 | Greenstein |
| 6,974,154 B2 | 12/2005 | Grossert et al. |
| 6,983,956 B2 | 1/2006 | Canterberry et al. |
| 6,994,372 B2 | 2/2006 | Ford et al. |
| 7,007,973 B2 | 3/2006 | Canterberry et al. |
| 7,017,945 B2 * | 3/2006 | DePottey ............ B60R 21/276 280/739 |
| 7,021,653 B2 | 4/2006 | Burdock et al. |
| 7,029,024 B2 | 4/2006 | Baumbach |
| 7,036,844 B2 | 5/2006 | Hammer et al. |
| 7,044,500 B2 | 5/2006 | Kalandek et al. |
| 7,044,502 B2 | 5/2006 | Trevillyan et al. |
| 7,048,298 B2 | 5/2006 | Arwood et al. |
| 7,052,034 B2 | 5/2006 | Lochmann |
| 7,055,856 B2 | 6/2006 | Ford et al. |
| 7,063,350 B2 | 6/2006 | Steimke et al. |
| 7,070,203 B2 | 7/2006 | Fisher et al. |
| 7,081,692 B2 | 7/2006 | Pettypiece, Jr. et al. |
| 7,090,246 B2 | 8/2006 | Lincoln et al. |
| 7,107,133 B2 | 9/2006 | Fisher et al. |
| 7,121,581 B2 | 10/2006 | Xu et al. |
| 7,121,628 B2 | 10/2006 | Lo |
| 7,131,662 B2 | 11/2006 | Fisher et al. |
| 7,131,664 B1 | 11/2006 | Pang et al. |
| 7,134,691 B2 | 11/2006 | Dunkle et al. |
| 7,147,245 B2 | 12/2006 | Flörsheimer et al. |
| 7,152,880 B1 | 12/2006 | Pang et al. |
| 7,163,236 B2 | 1/2007 | Masuda et al. |
| 7,172,213 B2 * | 2/2007 | Kreuzer ............. B60R 21/239 280/739 |
| 7,198,285 B2 | 4/2007 | Hochstein-Lenzen |
| 7,198,293 B2 | 4/2007 | Olson |
| 7,213,836 B2 | 5/2007 | Coon et al. |
| 7,216,891 B2 | 5/2007 | Biglino |
| 7,216,892 B2 | 5/2007 | Baumbach et al. |
| 7,222,877 B2 | 5/2007 | Wipasuramonton et al. |
| 7,255,364 B2 | 8/2007 | Bonam et al. |
| 7,261,315 B2 | 8/2007 | Hofmann et al. |
| 7,261,316 B1 | 8/2007 | Salmo et al. |
| 7,261,319 B2 | 8/2007 | DePottey et al. |
| 7,264,268 B2 | 9/2007 | Ehrke et al. |
| 7,264,269 B2 | 9/2007 | Gu et al. |
| 7,267,361 B2 | 9/2007 | Hofmann et al. |
| 7,270,344 B2 | 9/2007 | Schirholz et al. |
| 7,275,763 B2 | 10/2007 | Thomas et al. |
| 7,278,656 B1 | 10/2007 | Kalandek |
| 7,281,733 B2 | 10/2007 | Pieruch |
| 7,303,206 B2 | 12/2007 | Kippschull et al. |
| 7,318,599 B2 | 1/2008 | Magdun |
| 7,320,479 B2 | 1/2008 | Trevillyan et al. |
| 7,325,829 B2 | 2/2008 | Kelley et al. |
| 7,328,915 B2 | 2/2008 | Smith et al. |
| 7,341,276 B2 | 3/2008 | Kelley et al. |
| 7,347,449 B2 | 3/2008 | Rossbach et al. |
| 7,350,806 B2 | 4/2008 | Ridolfi et al. |
| 7,354,064 B2 | 4/2008 | Block et al. |
| 7,360,791 B2 | 4/2008 | Yamada |
| 7,367,590 B2 | 5/2008 | Koning et al. |
| 7,380,817 B2 | 6/2008 | Poli et al. |
| 7,390,018 B2 | 6/2008 | Ridolfi et al. |
| 7,398,994 B2 | 7/2008 | Poli et al. |
| 7,401,805 B2 | 7/2008 | Coon et al. |
| 7,401,808 B2 | 7/2008 | Rossbach et al. |
| 7,404,572 B2 | 7/2008 | Salmo et al. |
| 7,407,183 B2 | 8/2008 | Ford et al. |
| 7,413,220 B2 | 8/2008 | Itoga et al. |
| 7,431,332 B2 | 10/2008 | Wipasuramonton et al. |
| 7,445,237 B2 | 11/2008 | Boyle, III et al. |
| 7,452,002 B2 | 11/2008 | Baumbach et al. |
| 7,458,607 B2 | 12/2008 | Abe et al. |

(56) References Cited

U.S. PATENT DOCUMENTS

| | | | |
|---|---|---|---|
| 7,481,452 B2 | 1/2009 | Itoga et al. |
| 7,497,462 B2 | 3/2009 | Sakai et al. |
| 7,497,469 B2 | 3/2009 | Fischer et al. |
| 7,506,891 B2 | 3/2009 | Quioc et al. |
| 7,513,524 B2 | 4/2009 | Oota et al. |
| 7,533,897 B1 | 5/2009 | Xu et al. |
| 7,549,674 B2 | 6/2009 | Yoshikawa et al. |
| 7,557,052 B2 | 7/2009 | Konishi et al. |
| 7,594,675 B2 | 9/2009 | Bostrom et al. |
| 7,600,782 B2 | 10/2009 | Ishiguro et al. |
| 7,607,690 B2 | 10/2009 | Abe et al. |
| 7,614,653 B2 | 11/2009 | Rose et al. |
| 7,625,008 B2 | 12/2009 | Pang et al. |
| 7,641,233 B2* | 1/2010 | Korechika ............. B60R 21/02 280/730.1 |
| 7,648,167 B2 | 1/2010 | Bouquier et al. |
| 7,658,400 B2 | 2/2010 | Wipasuramonton et al. |
| 7,658,406 B2 | 2/2010 | Townsend et al. |
| 7,658,407 B2 | 2/2010 | Ford et al. |
| 7,658,409 B2 | 2/2010 | Ford et al. |
| 7,661,697 B2 | 2/2010 | Itoga |
| 7,665,761 B1 | 2/2010 | Green et al. |
| 7,669,897 B2 | 3/2010 | Sano |
| 7,681,914 B2* | 3/2010 | Maidel ................. B60R 21/239 280/729 |
| 7,681,917 B2 | 3/2010 | Guillo et al. |
| 7,703,796 B2 | 4/2010 | Manire et al. |
| 7,708,312 B2 | 5/2010 | Kalandek |
| 7,722,079 B2 | 5/2010 | Lee et al. |
| 7,726,685 B2 | 6/2010 | Kumagai et al. |
| 7,740,274 B2 | 6/2010 | Manssart |
| 7,753,402 B2 | 7/2010 | Volkmann et al. |
| 7,789,417 B2 | 9/2010 | Yoshikawa et al. |
| 7,789,418 B2 | 9/2010 | Wipasuramonton et al. |
| 7,798,522 B2 | 9/2010 | Itoga |
| 7,806,428 B2 | 10/2010 | Yoshikawa et al. |
| 7,837,223 B2 | 11/2010 | Shilliday et al. |
| 7,845,678 B2* | 12/2010 | Pausch ................ B60R 21/2338 280/735 |
| 7,845,681 B2 | 12/2010 | Abe et al. |
| 7,857,347 B2 | 12/2010 | Abe et al. |
| 7,874,583 B2 | 1/2011 | Sahm et al. |
| 7,878,538 B2 | 2/2011 | Abe et al. |
| 7,883,106 B2 | 2/2011 | Mical |
| 7,883,109 B2* | 2/2011 | Parks ................. B60R 21/2346 280/739 |
| 7,922,197 B2 | 4/2011 | Fukawatase et al. |
| 7,931,297 B2 | 4/2011 | Abe et al. |
| 7,954,850 B2 | 6/2011 | Fischer et al. |
| 7,976,058 B2 | 7/2011 | Suzuki et al. |
| 7,980,590 B2 | 7/2011 | Foubert et al. |
| 7,997,611 B2 | 8/2011 | Dufaut et al. |
| 8,020,889 B2 | 9/2011 | Bauer et al. |
| 8,020,891 B2 | 9/2011 | Fukawatase et al. |
| 8,070,183 B2 | 12/2011 | Kumagai et al. |
| 8,152,199 B2 | 4/2012 | Bauer et al. |
| 8,210,566 B2 | 7/2012 | Fukawatase et al. |
| 8,262,130 B2 | 9/2012 | Fischer et al. |
| 8,267,424 B2 | 9/2012 | Tomitaka et al. |
| 8,272,664 B2 | 9/2012 | Benny et al. |
| 8,353,532 B2 | 1/2013 | Abe et al. |
| 8,382,154 B2 | 2/2013 | Suzuki et al. |
| 8,408,494 B2 | 4/2013 | Garcia |
| 8,414,018 B2 | 4/2013 | Choi et al. |
| 8,419,054 B2 | 4/2013 | Abe et al. |
| 8,434,786 B2 | 5/2013 | Jang et al. |
| 8,439,398 B2* | 5/2013 | Baca ...................... B60R 21/18 280/733 |
| 8,466,579 B2 | 6/2013 | Petitpierre |
| 8,500,163 B2 | 8/2013 | Mallinger et al. |
| 8,523,220 B1 | 9/2013 | Gehret et al. |
| 8,528,932 B2 | 9/2013 | Islam et al. |
| 8,556,291 B2 | 10/2013 | Islam et al. |
| 8,573,642 B2 | 11/2013 | Suzuki et al. |
| 8,579,324 B2* | 11/2013 | Kwon et al. |
| 8,608,197 B2* | 12/2013 | Eckert ................. B60R 21/239 280/728.2 |
| 8,622,417 B1 | 1/2014 | Schneider et al. |
| 8,646,808 B2 | 2/2014 | Williams et al. |
| 8,651,521 B2 | 2/2014 | Kühne et al. |
| 8,657,334 B2 | 2/2014 | Mallinger et al. |
| 8,672,349 B2 | 3/2014 | Mendez et al. |
| 8,684,403 B2 | 4/2014 | Boyle et al. |
| 8,684,404 B2 | 4/2014 | Fischer et al. |
| 8,684,407 B2 | 4/2014 | Fischer et al. |
| 8,690,188 B2 | 4/2014 | Fiore |
| 8,702,121 B2 | 4/2014 | Yamashita et al. |
| 8,727,061 B2 | 5/2014 | Rydsmo et al. |
| 8,727,377 B2 | 5/2014 | Wang et al. |
| 8,727,378 B2 | 5/2014 | Hiruta et al. |
| 8,740,244 B2 | 6/2014 | Obadia |
| 8,746,736 B2 | 6/2014 | Mendez et al. |
| 8,851,511 B1 | 10/2014 | Volkmann et al. |
| 8,882,141 B2 | 11/2014 | Arnold et al. |
| 8,882,143 B2 | 11/2014 | Potter et al. |
| 8,888,126 B2 | 11/2014 | Nukaya et al. |
| 8,894,095 B1 | 11/2014 | Meister et al. |
| 8,919,811 B2 | 12/2014 | Langer et al. |
| 8,939,465 B2 | 1/2015 | Kastelic et al. |
| 8,955,914 B2 | 2/2015 | Meister et al. |
| 9,027,962 B1 | 5/2015 | Jang |
| 9,079,559 B2 | 7/2015 | Iwamoto et al. |
| 9,096,193 B2 | 8/2015 | Kalandek |
| 9,108,590 B2 | 8/2015 | Williams et al. |
| 9,126,510 B2 | 9/2015 | Hirako |
| 9,174,603 B2 | 11/2015 | Fischer et al. |
| 9,187,056 B1 | 11/2015 | Kwon |
| 9,199,602 B1 | 12/2015 | Fischer et al. |
| 9,227,592 B2 | 1/2016 | Polcwiartek et al. |
| 9,272,685 B2 | 3/2016 | Fischer et al. |
| 9,327,674 B2 | 5/2016 | Fischer et al. |
| 9,333,939 B2 | 5/2016 | Murakami et al. |
| 9,340,177 B2 | 5/2016 | Hiruta et al. |
| 9,352,721 B2 | 5/2016 | Jang |
| 9,376,081 B2 | 6/2016 | Choi |
| 9,376,086 B2* | 6/2016 | Nebel ................. B60R 21/2338 |
| 9,393,924 B2 | 7/2016 | Choi |
| 9,403,503 B2* | 8/2016 | Buchholz ............. B60R 21/239 |
| 9,434,345 B2 | 9/2016 | Koshikawa et al. |
| 9,434,346 B2* | 9/2016 | Weber ................. B60R 21/239 |
| 9,475,451 B2 | 10/2016 | Kwon |
| 9,499,119 B2 | 11/2016 | Ishiguro et al. |
| 9,555,726 B2 | 1/2017 | Jafri et al. |
| 9,555,764 B2 | 1/2017 | Maruoka et al. |
| 9,561,775 B2 | 2/2017 | Kim et al. |
| 9,573,556 B2 | 2/2017 | Ko et al. |
| 9,598,042 B2 | 3/2017 | Schneider et al. |
| 9,616,839 B2 | 4/2017 | Khouphongsy et al. |
| 9,650,012 B2 | 5/2017 | Fukurono et al. |
| 9,656,752 B2 | 5/2017 | Valdes et al. |
| 2001/0028161 A1 | 10/2001 | Hoagland |
| 2001/0048215 A1 | 12/2001 | Breed et al. |
| 2002/0011723 A1 | 1/2002 | Lewis |
| 2002/0024200 A1 | 2/2002 | Eckert et al. |
| 2002/0067031 A1 | 6/2002 | Busgen et al. |
| 2002/0089152 A1 | 7/2002 | Khoudari et al. |
| 2002/0101067 A1 | 8/2002 | Breed |
| 2002/0125700 A1 | 9/2002 | Adkisson |
| 2002/0125701 A1 | 9/2002 | Devonport |
| 2002/0125705 A1 | 9/2002 | Wong et al. |
| 2002/0140209 A1 | 10/2002 | Waid et al. |
| 2003/0127839 A1 | 7/2003 | Jenkins |
| 2003/0168837 A1 | 9/2003 | Schneider et al. |
| 2003/0178821 A1 | 9/2003 | Schneider et al. |
| 2004/0051280 A1 | 3/2004 | Anaya et al. |
| 2004/0164525 A1 | 8/2004 | Gray et al. |
| 2004/0164532 A1 | 8/2004 | Heidorn et al. |
| 2004/0178614 A1 | 9/2004 | Countryman et al. |
| 2004/0188988 A1 | 9/2004 | Wipasuramonton et al. |
| 2005/0006884 A1 | 1/2005 | Cooper et al. |
| 2005/0098990 A1 | 5/2005 | Pinsenschaum et al. |
| 2005/0146119 A1 | 7/2005 | Ford et al. |
| 2005/0212270 A1 | 9/2005 | Wipasuramonton et al. |

(56) References Cited

U.S. PATENT DOCUMENTS

| | | |
|---|---|---|
| 2005/0218635 A1 | 10/2005 | Wipasuramonton et al. |
| 2005/0248135 A1 | 11/2005 | Poli et al. |
| 2006/0108775 A1 | 5/2006 | Schirholz et al. |
| 2006/0119084 A1 | 6/2006 | Coon et al. |
| 2006/0175816 A1 | 8/2006 | Spencer et al. |
| 2006/0186644 A1 | 8/2006 | Manire et al. |
| 2006/0220360 A1 | 10/2006 | Ridolfi et al. |
| 2006/0255569 A1 | 11/2006 | Weissert et al. |
| 2006/0255570 A1 | 11/2006 | Wipasuramonton et al. |
| 2006/0267325 A1 | 11/2006 | Kumagai et al. |
| 2006/0282203 A1 | 12/2006 | Hasebe et al. |
| 2007/0001435 A1 | 1/2007 | Gray et al. |
| 2007/0001437 A1 | 1/2007 | Wall et al. |
| 2007/0013175 A1 | 1/2007 | Suyama et al. |
| 2007/0075534 A1 | 4/2007 | Kelley et al. |
| 2007/0075535 A1 | 4/2007 | Trevillyan et al. |
| 2007/0075536 A1 | 4/2007 | Kelley et al. |
| 2007/0080528 A1 | 4/2007 | Itoga et al. |
| 2007/0085309 A1 | 4/2007 | Kelley et al. |
| 2007/0102909 A1 | 5/2007 | Nezaki et al. |
| 2007/0108753 A1 | 5/2007 | Pang et al. |
| 2007/0138775 A1 | 6/2007 | Rossbach et al. |
| 2007/0138776 A1 | 6/2007 | Rossbach et al. |
| 2007/0152428 A1 | 7/2007 | Poli et al. |
| 2007/0170717 A1 | 7/2007 | Dirassuian |
| 2007/0182137 A1 | 8/2007 | Hiroshige et al. |
| 2007/0200329 A1 | 8/2007 | Ma |
| 2007/0222189 A1 | 9/2007 | Baumbach et al. |
| 2007/0241223 A1 | 10/2007 | Boelstler et al. |
| 2007/0246922 A1 | 10/2007 | Manssart |
| 2008/0018086 A1 | 1/2008 | Ford et al. |
| 2008/0042416 A1 | 2/2008 | Razazi et al. |
| 2008/0054602 A1 | 3/2008 | Yang |
| 2008/0084050 A1 | 4/2008 | Volkmann et al. |
| 2008/0088118 A1 | 4/2008 | Wipasuramonton et al. |
| 2008/0106074 A1 | 5/2008 | Ford |
| 2008/0315567 A1 | 12/2008 | Fischer et al. |
| 2009/0020032 A1 | 1/2009 | Trevillyan |
| 2009/0020197 A1 | 1/2009 | Hosey |
| 2009/0051149 A1 | 2/2009 | Kalandek et al. |
| 2009/0051150 A1 | 2/2009 | Murakami |
| 2009/0058052 A1 | 3/2009 | Ford et al. |
| 2009/0066063 A1 | 3/2009 | Mical |
| 2009/0111341 A1 | 4/2009 | Rodriguez |
| 2009/0236828 A1 | 9/2009 | Foubert et al. |
| 2009/0289479 A1 | 11/2009 | Kumagai et al. |
| 2010/0066060 A1 | 3/2010 | Kalandek |
| 2010/0084840 A1 | 4/2010 | Ohlsson et al. |
| 2010/0102542 A1 | 4/2010 | Nakajima et al. |
| 2010/0115737 A1 | 5/2010 | Foubert |
| 2010/0164208 A1 | 7/2010 | Kalandek |
| 2010/0276540 A1 | 11/2010 | Rojo |
| 2011/0031723 A1 | 2/2011 | Fischer et al. |
| 2011/0049850 A1 | 3/2011 | Horikawa et al. |
| 2011/0233980 A1 | 9/2011 | Hoshi et al. |
| 2011/0285115 A1 | 11/2011 | Putala et al. |
| 2012/0038137 A1 | 2/2012 | Wipasuramonton et al. |
| 2012/0074677 A1 | 3/2012 | Hiruta et al. |
| 2012/0091764 A1 | 4/2012 | Cailleteau et al. |
| 2012/0256399 A1 | 10/2012 | Kokeguchi |
| 2012/0256403 A1 | 10/2012 | Shields |
| 2012/0261911 A1 | 10/2012 | Baca et al. |
| 2013/0009430 A1 | 1/2013 | Islam et al. |
| 2013/0015642 A1 | 1/2013 | Islam et al. |
| 2013/0015686 A1 | 1/2013 | Islam et al. |
| 2013/0026803 A1 | 1/2013 | Islam et al. |
| 2013/0075524 A1 | 3/2013 | Islam et al. |
| 2013/0088056 A1 | 4/2013 | Quatanens et al. |
| 2013/0093221 A1 | 4/2013 | Ligonniere et al. |
| 2013/0106079 A1 | 5/2013 | Jarboe et al. |
| 2013/0106080 A1 | 5/2013 | Jarboe et al. |
| 2013/0119645 A1 | 5/2013 | Eckert et al. |
| 2013/0134697 A1 | 5/2013 | Choi et al. |
| 2013/0147167 A1 | 6/2013 | Kwon et al. |
| 2013/0187646 A1 | 7/2013 | Baca et al. |
| 2013/0197746 A1 | 8/2013 | Glueck et al. |
| 2013/0221644 A1 | 8/2013 | Beattie et al. |
| 2013/0241180 A1 | 9/2013 | Gehret et al. |
| 2013/0307253 A1 | 11/2013 | Shin et al. |
| 2013/0307279 A1 | 11/2013 | De Morais et al. |
| 2013/0341975 A1 | 12/2013 | Schneider et al. |
| 2014/0027574 A1 | 1/2014 | Obadia et al. |
| 2014/0063255 A1 | 3/2014 | Breed |
| 2014/0077478 A1 | 3/2014 | Islam et al. |
| 2014/0159356 A1 | 6/2014 | Kastelic et al. |
| 2015/0014969 A1 | 1/2015 | Choi |
| 2015/0042078 A1 | 2/2015 | Gehret et al. |
| 2015/0123385 A1 | 5/2015 | Frelsler et al. |
| 2015/0232184 A1 | 8/2015 | Gehret et al. |
| 2016/0001735 A1 | 1/2016 | Quatanens et al. |
| 2016/0052636 A1 | 2/2016 | Moeller et al. |
| 2016/0096627 A1 | 4/2016 | Gehret et al. |
| 2016/0288756 A1 | 10/2016 | Ishiguro et al. |
| 2017/0028960 A1 | 2/2017 | Kobayashi et al. |
| 2017/0072897 A1 | 3/2017 | Kruse et al. |
| 2017/0088087 A1 | 3/2017 | Williams |
| 2017/0129445 A1 | 5/2017 | Kim |
| 2017/0197578 A1 | 7/2017 | Hatfield |
| 2017/0225788 A1* | 8/2017 | Humbert ............ B64D 11/0621 |

FOREIGN PATENT DOCUMENTS

| | | | |
|---|---|---|---|
| DE | 4019596 A1 | 1/1992 | |
| DE | 4116162 A1 | 11/1992 | |
| DE | 4218252 A1 | 12/1992 | |
| DE | 4211209 A1 | 10/1993 | |
| DE | 4329275 A1 | 3/1995 | |
| DE | 19742151 A1 | 4/1998 | |
| DE | 29912578 U1 | 5/2000 | |
| DE | 10041042 A1 | 5/2001 | |
| EP | 0639481 A1 | 2/1995 | |
| EP | 0684168 A1 | 11/1995 | |
| EP | 0765780 A1 | 4/1997 | |
| EP | 1101660 B1 | 5/2001 | |
| EP | 1712427 A1 | 10/2006 | |
| EP | 1767396 A1 | 3/2007 | |
| EP | 2028103 A2 | 2/2009 | |
| EP | 2543556 A1 | 1/2013 | |
| EP | 2546111 A1 | 1/2013 | |
| EP | 2572994 A2 | 3/2013 | |
| EP | 2581276 A1 | 4/2013 | |
| EP | 2636597 A2 | 9/2013 | |
| EP | 2543557 B1 | 4/2014 | |
| EP | 2596995 B1 | 9/2014 | |
| EP | 2914460 B1 | 12/2016 | |
| FR | 2703011 A1 | 9/1994 | |
| GB | 1362672 A | 8/1974 | |
| GB | 2306876 A | 5/1997 | |
| GB | 2368050 A | 4/2002 | |
| GB | 2410009 A | 7/2005 | |
| JP | 63258239 A | 10/1988 | |
| JP | 1083436 A | 3/1989 | |
| JP | 6483436 | 3/1989 | |
| JP | 11189117 A | 7/1999 | |
| JP | 2000142303 A | 5/2000 | |
| JP | 2009001064 A | * 1/2009 | ......... B60R 21/2338 |
| JP | 2009001064 A | 1/2009 | |
| JP | 2011051413 A | 3/2011 | |
| JP | 2011126381 A | 6/2011 | |
| JP | 2016222203 A | 12/2016 | |
| WO | 8807947 A1 | 10/1988 | |
| WO | 9813226 A1 | 4/1998 | |
| WO | 9841426 A1 | 9/1998 | |
| WO | 9939940 A1 | 8/1999 | |
| WO | 9942336 A1 | 8/1999 | |
| WO | 0100456 A1 | 1/2001 | |
| WO | 0168413 A1 | 9/2001 | |
| WO | 2013012890 A1 | 1/2013 | |
| WO | 2013019248 A2 | 2/2013 | |
| WO | 2013128430 A1 | 9/2013 | |
| WO | 2014024046 A2 | 2/2014 | |
| WO | 2015170841 A1 | 11/2015 | |

(56) References Cited

FOREIGN PATENT DOCUMENTS

| WO | 2016032971 A1 | 3/2016 |
|----|---------------|--------|
| WO | 2016041783    | 3/2016 |
| WO | 2017017278    | 7/2016 |

OTHER PUBLICATIONS

"Takata Melds Air Bag with Seat Belt," The Japan Times, Nov. 27, 2010, 1 page.
Federal Aviation Administration (FAA) policy statement PS-ANM-25-03, Technical Criteria for Approving Side-Facing Seats, dated Jun. 8, 2012.
Grierson et al., Simula's Line of Inflatable Restraint Technologies, TTCP Technical Report Proceedings of the Workshop: Inflatable Restraints in Aviation, May 2000, pp. 41-51.
Minicooper Manual dated 2006.
Renault Espce Manual dated 2002.

* cited by examiner

ACTIVE AIRBAG VENT SYSTEM

CROSS-REFERENCE TO RELATED APPLICATION

The present application claims the benefit of and priority under 35 U.S.C. § 119(e) to U.S. Provisional Patent Application No. 62/146,268, filed Apr. 11, 2015, and incorporated herein by reference in its entirety.

TECHNICAL FIELD

The present technology relates generally to airbag safety systems, and more specifically, to airbag venting systems for use with airbags on aircraft and other vehicles, and associated systems and methods.

BACKGROUND

Various types of seat belt and airbag systems have been used to protect passengers in automobiles, aircraft, and other vehicles. In automobiles, for example, airbags typically deploy from the steering column, dashboard, side panel, and/or other fixed locations. In aircraft, airbags can deploy from seat belts (e.g., lap or shoulder belts), seats and/or other aircraft structures. In a typical airbag system, a sensor detects a rapid deceleration event (e.g., a collision or crash) and transmits a corresponding signal to an initiation device (e.g., a pyrotechnic device) on an airbag inflator. This causes the inflator to release compressed gas into the airbag, thereby rapidly inflating and deploying the airbag.

A typical airbag is designed to deploy toward an occupant and slow the velocity of the occupant to a rate that is non-injurious or reduces injury. Generally, the airbag is positioned between the occupant and the surrounding structure in the direction of impact. As the occupant contacts the airbag, the airbag is compressed against and/or into the surrounding structure and the internal pressure increases. As the internal airbag pressure increases, the rate of occupant deceleration also increases, and can become excessively high. The rate of deceleration can be reduced by using vents in the airbag to release some of the internal pressure during occupant impact. Such vents cannot release all the internal pressure during impact, however, because doing so would greatly reduce occupant protection. After the initial contact, compression of the airbag continues until the occupant's movement is momentarily arrested. At that time, the compressed airbag accelerates the occupant in an opposite direction (e.g., rearward toward the seat in which the occupant was seated). This is known as "airbag rebound." Improved airbag systems are needed to enhance occupant protection by actively deflating airbags to reduce airbag rebound.

DETAILED DESCRIPTION

Figure 1A:
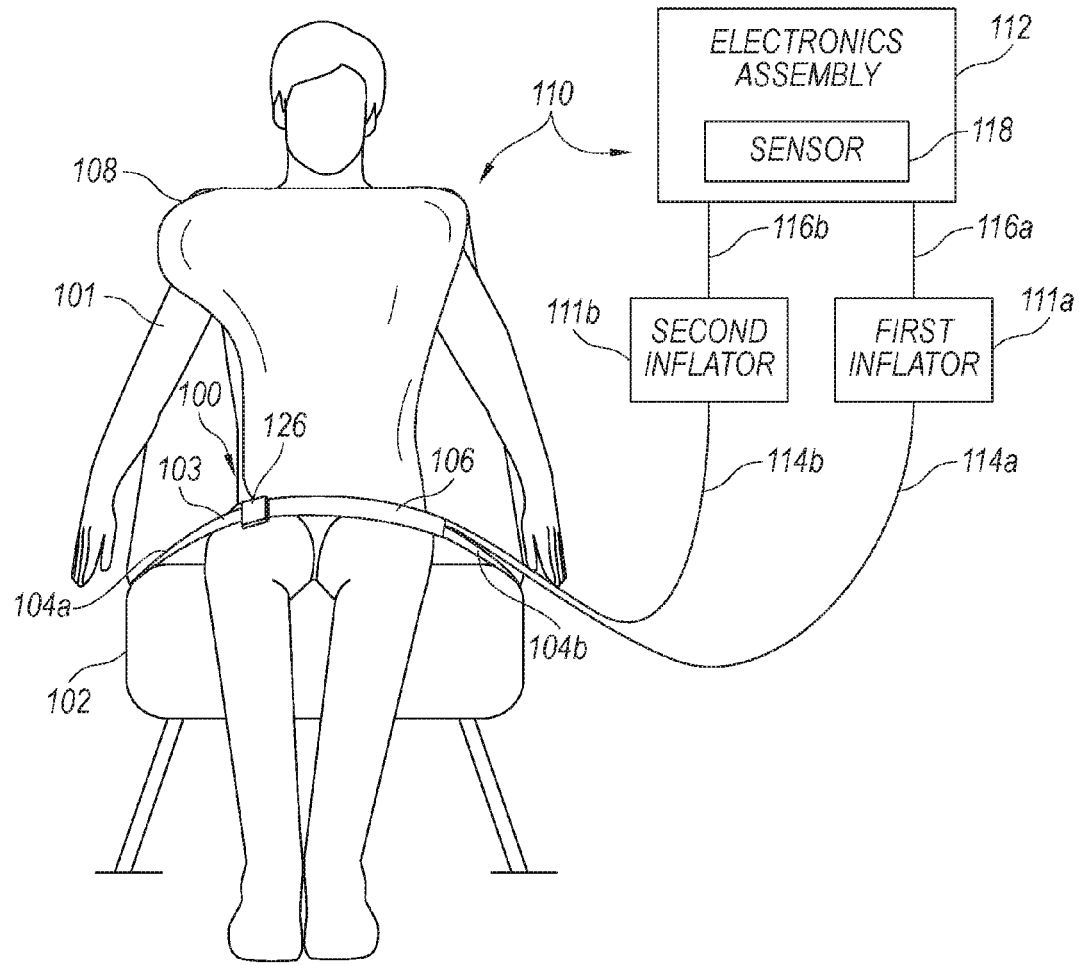
FIG. 1A is a partially schematic front view of an occupant restraint system illustrating a deployed airbag having an active vent configured in accordance with an embodiment of the present technology.

The present technology describes various embodiments of active airbag vent systems and methods of making and using such systems. The active airbag vent systems and methods described herein can reduce occupant rebound that may be experienced with conventional airbag systems. In several embodiments of the present technology, an active airbag vent system has a vent that remains closed during initial deployment of the airbag, but is then actively opened momentarily afterward to allow gas to escape from the airbag. The vent can be opened in response to a mechanical or electrical signal based on the internal pressure of the airbag (e.g., the airbag reaching a predetermined pressure threshold), the position of the occupant (e.g., the position of the occupant relative to a seat, an airbag, and/or another structure), and/or an elapsed time interval (e.g., a predetermined time period) after initial deployment of the airbag. The use of an active vent allows the airbag to maintain pressure during an accident or other rapid deceleration event to protect the occupant up to the point of occupant rebound, at which time the airbag pressure rapidly drops to reduce rebound.

In some embodiments of the present technology, an airbag system can include two inflators. The first inflator is operably connected to a main volume of the airbag to deploy and inflate the airbag. The second inflator is operably connected to a vent to rupture or release the vent after the airbag has at least partially deployed. The first and second inflators can be deployed by a single electronic module assembly and/or two separate electronic module assemblies configured to delay firing or initiation of the second inflator relative to the first inflator. The first inflator can be installed in the airbag and/or external to the airbag, and gas (e.g., air) can be routed into the airbag via a hose or other suitable delivery conduit extending from the first inflator to the airbag. As described herein, the second inflator can be also installed in the airbag and/or external to the airbag. A hose extending from the second inflator can be in fluid communication with the active vent. The active vent can be sewn, glued, heat sealed, or otherwise closed. The vent can be configured to release, rupture, and/or tear apart when, for example, gas from the second inflator expands the hose or inflates an airbag chamber inside the airbag against the vent.

Certain details are set forth in the following description and in FIGS. 1A-12 to provide a thorough understanding of various embodiments of the present technology. Other details describing well-known structures and systems often associated with airbags, occupant restraint systems, airbag initiation circuitry, etc., however, are not set forth below to avoid unnecessarily obscuring the description of the various embodiments of the present technology.

Many of the details, dimensions, angles and other features shown in FIGS. 1A-12 are merely illustrative of particular embodiments of the present technology. Accordingly, other embodiments can include other details, dimensions, angles and features without departing from the spirit or scope of the present invention. In addition, those of ordinary skill in the art will appreciate that further embodiments of the active airbag vent systems described herein can be practiced without several of the details described below. Various embodiments of the present technology can also include structures other than those illustrated in the Figures and are expressly not limited to the structures shown in the Figures. Moreover, the various elements and features illustrated in the Figures may not be drawn to scale.

In the Figures, identical reference numbers identify identical or at least generally similar elements. To facilitate the discussion of any particular element, the most significant digit or digits of any reference number refer to the Figure in which that element is first introduced. For example, element 110 is first introduced and discussed with reference to FIG. 1A.

FIG. 1A is a front view of an occupant restraint system 100 having an airbag system 110 configured in accordance with an embodiment of the present technology. In the illustrated embodiment, the restraint system 100 secures an occupant 101 in a vehicle seat 102. The seat 102 can be positioned in various orientations and in a variety of vehicles, such as aircraft (e.g., private, commercial, and/or military airplanes, helicopters, etc.), ground vehicles (e.g., private, commercial, and/or military automobiles, trucks, buses, trains, etc.), watercraft, spacecraft, etc. In some embodiments, for example, the restraint system 100 can be used with passenger seats in a commercial airplane. The restraint system 100 can include one or more belts or webs extending around the occupant 101 and connected together with one or more buckles. As used herein, "webs" can refer to a flexible strap or belt suitable for restraining an occupant during an accident event, such as a typical seat belt made from a woven material (e.g., nylon). In the illustrated embodiment, for example, the restraint system 100 includes lap belt 103 having a first web portion 104a joined to a second web portion 104b by a releasable buckle 126. In other embodiments, the restraint system 100 can include additional webs, such as a shoulder belt that extends across the occupant's torso and/or a crotch belt that extends between the occupant's legs.

In the illustrated embodiment, the second web portion 104b carries an airbag 108 that is enclosed in a cover 106 prior to deployment. The airbag 108 is shown in FIG. 1 in the inflated state after deployment. When the airbag 108 is not inflated, it can be rolled, folded, stuffed, or otherwise suitably stowed within the cover 106 such that the second web portion 104b has the general appearance of a conventional seat belt with padding. In other embodiments, the airbag 108 can have other shapes and be mounted in other positions and/or to other structures than that shown in FIG. 1A. For example, the airbag 108 can be mounted to the first web portion 104a, a shoulder belt, to the back of a seat positioned directly in front of the seat 102, to a partition, galley wall, privacy wall, other monument, etc.

In the illustrated embodiment, the airbag system 110 includes one or more inflators 111 (identified individually as a first inflator 111a and a second inflator 111b). The inflators 111 can be operably coupled to one or more electronics assemblies 112 (e.g., an electronics module assembly ("EMA"); shown schematically) via corresponding electrical links 116 (e.g., a wire, electrical line, retractile cord, connector, wireless communication link, etc.; identified individually as a first electrical link 116a and a second electrical link 116b). The electronics assembly 112 can include one or more crash sensors 118 (e.g., a an acceleration sensor, such as a magnetic field sensor, etc.) and associated devices and circuitry configured to detect a rapid deceleration event above a preset magnitude, and transmit one or more corresponding signals to the inflators 111 via the electrical links 116. As described in greater detail below, in one embodiment the electronics assembly 112 is configured to transmit a first signal to the first inflator 111a to initiate deployment of the first airbag 108, and a second signal to the second inflator 111b to initiate deployment of a second airbag (not shown in FIG. 1A) at a different time. In some embodiments, a first electronics assembly can be configured to transmit a first signal to the first inflator 111a to initiate deployment of the first airbag 108, and a second electronics assembly can be configured to transmit a second signal to the second inflator 111b to initiate deployment of a second airbag (not shown in FIG. 1A) shortly after the first signal is transmitted.

Each of the inflators 111 can include a canister, cylinder, and/or other container filled with a substantially inert compressed gas (e.g., air, nitrogen, helium, argon, etc.). The gas can be released by a spike in internal pressure caused by a pyrotechnic, electric, or other initiation device (not shown) that is activated by an electrical signal from the electronics assembly 112 in response to a rapid deceleration event or similar dynamic event (e.g., an impact, collision, crash, acceleration, etc.). In other embodiments, the inflators 111 can include a propellant-based gas generating device and/or other gas sources suitable for airbag inflation.

Each of the inflators 111a, 111b is operably coupled to a first end portion of a respective hose 114 (identified individually as a first hose 114a and a second hose 114b). A second end portion of the first hose 114a can be operably connected to the airbag 108 so that gas can flow from the first inflator 111a to the airbag 108 during deployment. As described in more detail below with reference to FIGS. 2-3, according to certain embodiments, a second end portion of the second hose 114b can be operably connected to a second airbag (not shown in FIG. 1A) positioned within the first airbag 108. The second hose 114b enables gas to flow from the second inflator 111b to inflate the second airbag, and thereby open a vent in the first airbag 108 after initial deployment of the first airbag 108. The hoses 114 can be flexible fabric hoses made from the same material as the airbag 108 (e.g., nylon). In other embodiments, the hoses 114 can be made from other suitable materials known in the art, such as Kevlar, polyurethane, etc. that can, for example, provide a gas flow path from the inflators 111 to the respective airbags.

In operation, the restraint system 100 can protect the occupant 101 during a crash, rapid deceleration event, or other type of dynamic event above a preset level of acceleration/deceleration. For example, upon detection of such an event, the electronics assembly 112 can transmit a first signal to the first inflator 111a via the first electrical link 116a, causing the compressed gas stored within the inflator 111a to rapidly inflate the first airbag 108 via the first hose 114a. As shown in FIG. 1A, the airbag 108 can deploy upwardly from the lap belt 103 in front of the occupant 101 to provide forward impact protection. The seat belt-deployable airbag 108 of FIG. 1A positions the airbag 108 in front of the occupant 101, and may be of particular use when incorporated into aircraft and other vehicle seats with movable seat backs.

In the illustrated embodiment, the airbag 108 is carried on or otherwise supported by the second web portion 104b of the lap belt 103. In other embodiments, the airbag 108 can be carried on and deployed from the first web portion 104a, or from other portions of the web or other structures (e.g., adjacent vehicle or seat structures). For example, in certain embodiments the airbag 108 can deploy from a shoulder web, a seat back or other monument, and/or provide impact protection from different angles (e.g., side impact protection).

Figure 1B:
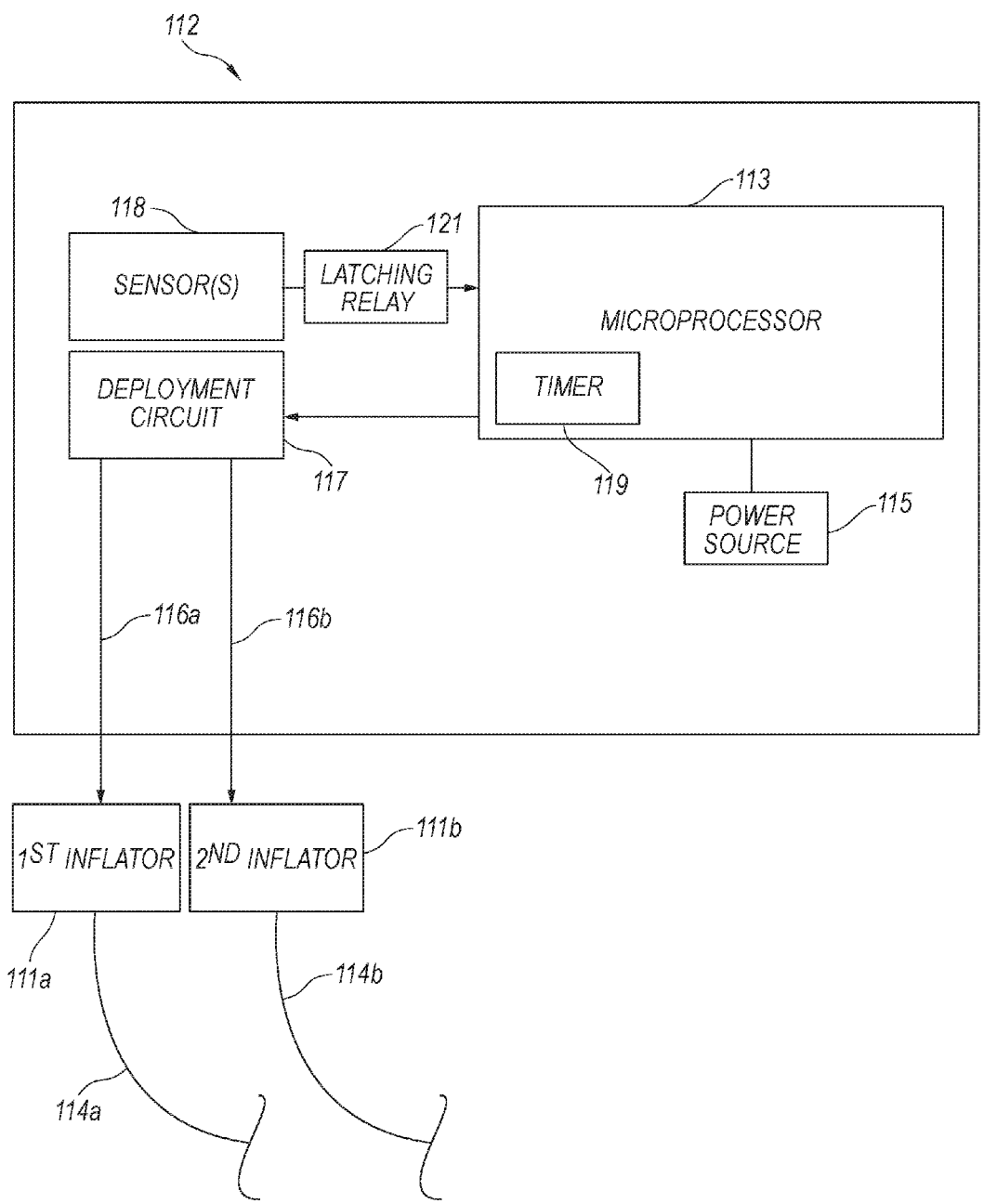
FIG. 1B is a partial schematic view taken from FIG. 1A illustrating details of an electronics assembly configured in accordance with an embodiment of the present technology.

As schematically illustrated in FIG. 1B, according to an embodiment of the present technology, the electronics assembly 112 can include a microprocessor 113 that receives electrical power from a power source 115 (e.g., one or more batteries). The one or more crash sensors 118 (e.g., an acceleration sensor, a magnetic field sensor, etc.) can detect a rapid deceleration event and communicate this event to the microprocessor 113. As shown in FIG. 1B, in certain embodiments the electronics assembly 112 can also include a latching relay 121 (e.g., an electrical relay) positioned between the sensor 118 and the microprocessor 113 and/or elsewhere within the electronics assembly 112. The latching relay 121 provides a path to ground to allow for inflation of the second inflator 111b. For example, the latching relay 121 can maintain a completed circuit after a crash event has been detected by the sensor 118 and after the sensor 118 has returned to a normal state (i.e., in which the circuit is open) to allow the microprocessor 113 to send the second signal and initiate deployment of the second inflator 111b. For example, in operation, when the sensor 118 detects a rapid deceleration or other crash event above a preset magnitude, one or more switches in the sensor 118 and the latching relay 121 can close and cause the microprocessor 113 to send a corresponding signal to a deployment circuit 117. Upon receiving the signal from the microprocessor 113, the deployment circuit 117 transmits a first signal to the first inflator 111a via the first electrical link 116a to initiate deployment of the first airbag 108 (e.g., discharge gas into the airbag 108 via the hose 114a).

The deployment circuit 117 can be configured to transmit a second signal to the second inflator 111b via the second electrical link 116b after transmitting the first signal to the first inflator 111a to expand the second hose 114b or inflate a second airbag operably connected to the second hose 114b. The deployment circuit 117 and/or the microprocessor 113 can include one or more timers 119 (e.g., a resistor-capacitor circuit "RC circuit" or other timing circuit) and/or a programmable routine to instruct the deployment circuit 117 to transmit the second signal a short period of time after the first signal is sent or the rapid deceleration event is detected. For example, the microprocessor 113 or sensor 118 can send a signal to start the timer 119 or routine when a rapid deceleration event is detected or a signal is transmitted to initiate the first inflator 111a. The deployment circuit 117 can transmit the second signal to initiate the second inflator 111b after a time period of from about 100 ms to 200 ms, from about 100 ms to 180 ms, from about 100 ms to 172 ms, about 120 ms, about 130 ms, and/or a different time period after a predetermined event. The second signal can be sent, for example, a predetermined period of time after the first signal is sent, after detection of the rapid deceleration event, after initiation of the first inflator 111a, and/or after initial deployment of the airbag 108.

Figure 2:
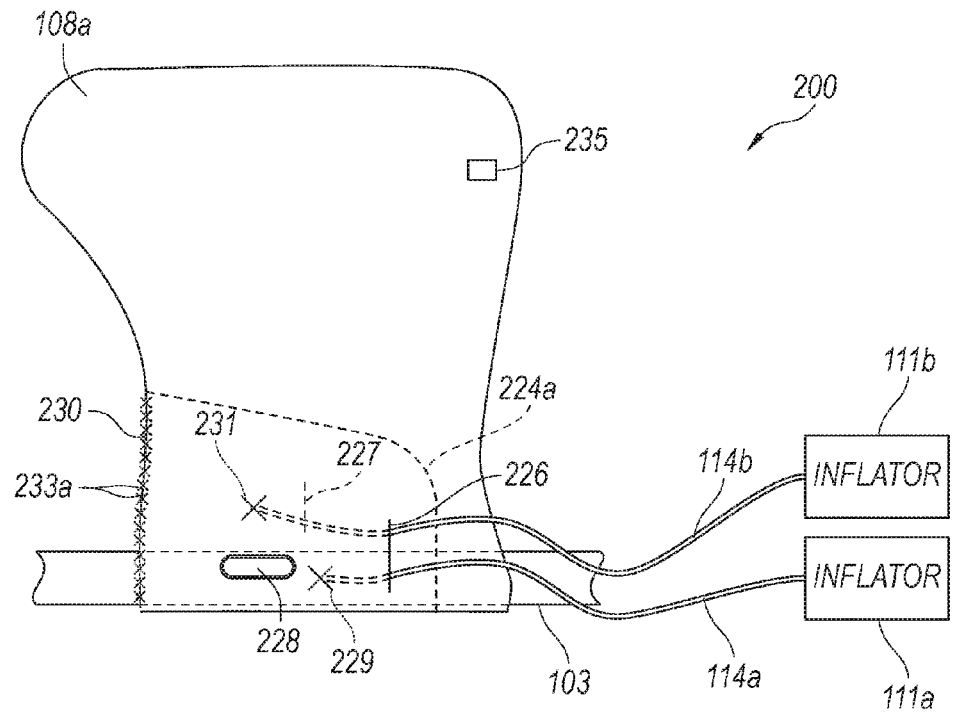
FIG. 2 is a front view of an airbag assembly having an active vent configured in accordance with an embodiment of the present technology.

FIG. 2 is a front view of an airbag assembly 200 including a first airbag 108a configured in accordance with an embodiment of the present technology. The first airbag 108a is secured to the lap belt 103 via first stitching 228 (e.g., "racetrack" stitching) or other suitable fasteners. A second airbag 224a is sewn into the interior of the first airbag 108a. The first and second hoses 114a, 114b enter the first airbag 108a through a first opening 226 (e.g., a slit). The first hose 114a is attached to the inside of the first airbag 108a with second stitching 229 or other suitable fasteners. The second hose 114b enters the second airbag 224a through a second opening 227 (e.g., a slit) in the second airbag 224a, and is attached to the inside of the second airbag 224a with third stitching 231 or other suitable fasteners. The first and second hoses 114a, 114b provide gas from the inflators 111a and 111b to deploy the first airbag 108a and the second airbag 224a, respectively. As illustrated in FIG. 2, the second airbag 224a can be sewn to the first airbag 108a with fourth stitching 233a, forming one or more common seams 230 (e.g., perimeter seams). The common seams 230 close and seal both the first airbag 108a and the second airbag 224a.

According to the embodiment of FIG. 2, the first inflator 111a inflates the first airbag 108a in response to a rapid deceleration event in a conventional manner. Shortly after the first airbag 108a is deployed (e.g., 100-180 ms after), the second inflator 111b is initiated to inflate and over-pressurize the second airbag 224a. The second airbag 224a is inflated until one or more of the common seams 230 rupture (e.g., fail, tear apart, release, or open) to rapidly deflate the first airbag 108a and reduce occupant rebound from the first airbag 108a.

As described above, the electronics assembly 112 can transmit a signal to the second inflator 111b to initiate the second inflator 111b after the first inflator 111a deploys the first airbag 108 (e.g., airbag 108a). For example, the electronics assembly 112 can stagger the first and second inflator signals by a period of time from about 100 ms to 200 ms, 100 ms to 180 ms, 100 ms to 172 ms, about 120 ms, or about 130 ms, and/or any value therebetween. In other embodiments, the electronics assembly 112 can transmit the second signal to the second inflator 111b to initiate second airbag inflation based on various other criteria, such as the internal pressure of the first airbag 108a (e.g., reaching a predetermined level). For example, the airbag 108 can include one or more pressure sensors 235 (shown schematically) to sense and provide internal pressure information to the electronics assembly 112. The electronics assembly 112 can be configured to transmit the second signal to initiate second airbag inflation when the internal pressure reaches a predetermined level. In other embodiments, other sensors (e.g., accelerometers, displacement sensors, etc.) in the airbag 108, lap belt 103, seat 102 (FIG. 1A), and/or other surrounding structures can provide occupant acceleration, position, and/or displacement information to the electronics assembly 112. The electronics assembly 112 can be configured to transmit the second signal to initiate second airbag inflation when, for example, the occupant reaches a predetermined level of acceleration or a position relative to the seat 102. In a further embodiment, the electronics assembly 112 can be configured to transmit the second signal to the second inflator 111b to initiate the second inflator 111b based on a preset or predetermined time period after initial deployment of the first airbag 108a.

Figure 3:
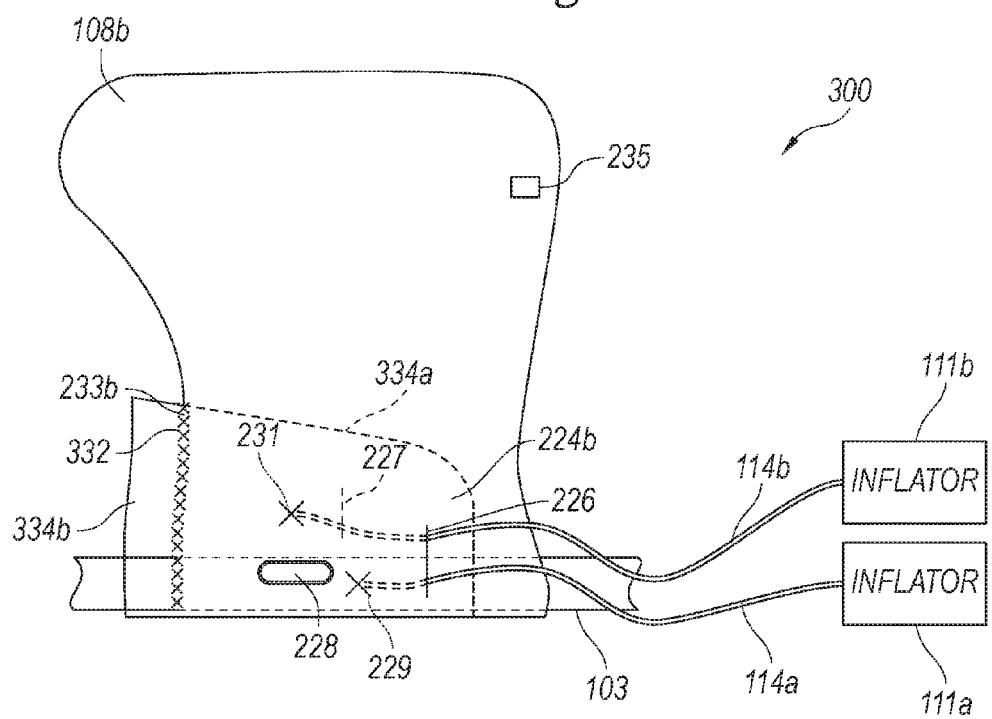
FIG. 3 is a front view of an airbag assembly having an active vent configured in accordance with another embodiment of the present technology.

FIG. 3 is a front view of an airbag assembly 300 including a first airbag 108b configured in accordance with another embodiment of the present technology. The embodiment of FIG. 3 is substantially similar to the embodiment of FIG. 2, however, in this embodiment, a second airbag 224b is not sewn at a common seam 230 (FIG. 2) that seals both airbags. Instead, the second airbag 224b is sewn to the first airbag 108b with a seam 332 in such a way that the seam 332 only seals the first airbag 108b. The seam 332 is sewn through the first airbag 108b and the second airbag 224b with a fourth stitching 233b. The second airbag 224b includes an interior portion 334a disposed inside the first airbag 108b and an exterior portion 334b disposed outside the first airbag 108b. The exterior portion 334b extends from the first airbag 108b through the seam 332. In operation, the second airbag 224b is inflated momentarily after the first airbag 108b is inflated in a similar manner as described above with reference to FIG. 2. The second airbag 224b (e.g., the interior portion 334a) is inflated until the seam 332 ruptures (e.g., fails, tears apart, releases, or opens) to rapidly deflate the first airbag 108b and reduce occupant rebound from the first airbag 108b. The second airbag 224b remains inflated because the ruptured seam 332 does not release gas from the second airbag 224b. Such a configuration allows the second airbag 224b to be reusable because the airbag assembly of FIG. 3 is designed to rupture the seam 332 upon inflation without tearing the second airbag 224b, instead of rupturing the seal of both airbags apart at a common seam 230 as in the embodiment of FIG. 2.

Figure 4A:
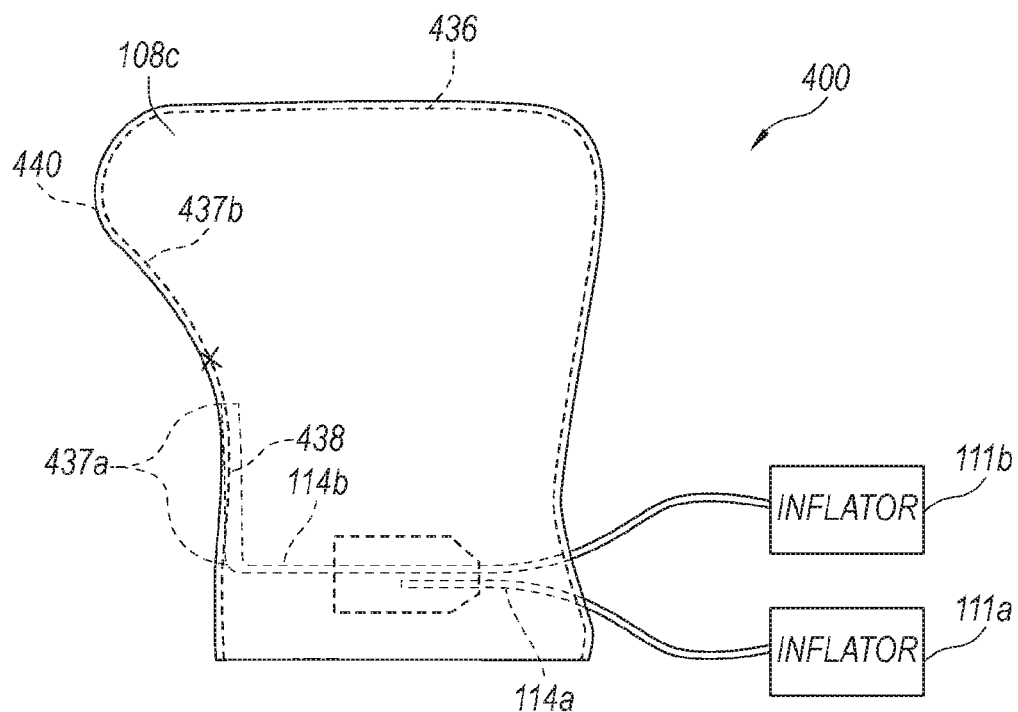
FIG. 4A is a front view of an airbag assembly having an active vent configured in accordance with a further embodiment of the present technology.
Figure 4B:
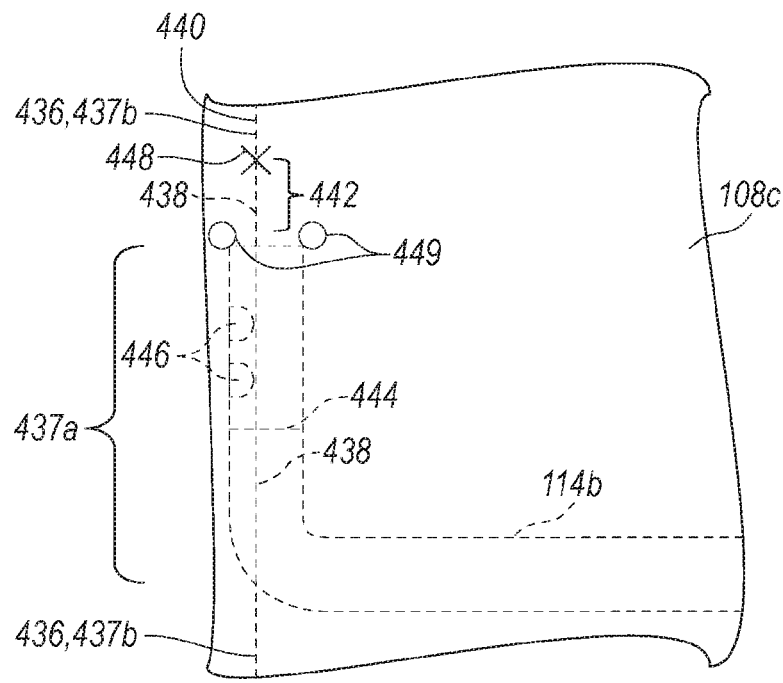
FIG. 4B is an enlarged view taken from FIG. 4A.

FIG. 4A is a front view of an airbag assembly 400 including an airbag 108c configured in accordance with another embodiment of the present technology, and FIG. 4B is an enlarged view of a portion of the airbag 108c taken from FIG. 4A. In the illustrated embodiments, a second airbag within the airbag 108c is not required. Referring to FIGS. 4A and 4B together, a seam 436 sews airbag material panels together around a perimeter of the airbag 108c. The seam 436 includes a first seam portion 437a and a second seam portion 437b. The first seam portion 437a is sewn over the second hose 114b to secure the second hose 114b to the interior of the airbag 108c such that the second hose 114b is positioned or sandwiched between the airbag material panels. The first seam portion 437a can be sewn with a first stitching type 438 (e.g., a lock stitch). The first stitching type 438 is configured to have sufficient strength to sew the airbag material panels to the second hose 114b, yet weak enough to tear apart upon inflation of the second air hose 114b to release the first seam portion 437a. As described in further detail below, releasing the first seam portion 437a rapidly deflates the airbag 108c and reduces occupant rebound from the airbag 108c. The airbag material panels can be sewn together along the second seam portion 437b (e.g., the remaining portion of the seam 436 away from the second hose 114b) with a second stitching type 440 (e.g., a chain stitch). In some embodiments, the second stitching type 440 is configured to be relatively "forgiving" to sew the airbag material panels together along curved portions of the second seam portion 437b.

As illustrated in the enlarged view of FIG. 4B, in some embodiments, the first seam portion 437a extends past an end portion of the second hose 114b, forming a third seam portion 442 (e.g., a transition portion) that is sewn with the first stitching type 438. The third seam portion 442 is not sewn or attached directly to the second hose 114b and is positioned between the first seam portion 437a and second seam portion 437b. For example, the third seam portion 442 extends from the end portion of the second hose 114b to a stopper 448 (as indicated by the "X" in FIG. 4B) on the seam 436. As described in more detail below, the stopper 448 at the end of the third portion 442 can provide a stop or end point to limit a tear or rupture of the first seam portion 437a.

In some embodiments, the second hose 114b can be sewn partially or substantially shut by a stitching 444 or other suitable fastener before one or more diffuser holes 446 in the second hose 114b. The partial closure of the second hose 114b limits the amount of gas escaping through the diffuser holes 446 so that the second hose 114b inflates more rapidly and, therefore, the more rapidly rupturing the first seam portion 437a. In this embodiment, the second hose 114b is not completely sewn shut by the stitching 444, as this could cause undue pressure in the second hose 114b when inflated, causing the second hose 114b to fail. Instead, the stitching 444 allows a relatively small amount of gas to seep or leak through the stitching 444 out the diffuser holes 446. Due to the more rapid inflation of the second hose 114b caused by the partially closed stitching 44, the second inflator 111b that inflates the second hose 114b can be smaller relative to the first inflator 111a (i.e., hold less compressed gas within the second inflator 111b than is held in the first inflator 111a) because less gas is needed to inflate the second hose 114b and rupture the first seam portion 437a. In various embodiments, the end portion of the second hose 114b can also be oriented or angled such that none or few of the diffuser holes 446 are directed inwardly toward the interior of the airbag 108c. For example, one, two, three, four, or more of the diffuser holes 446 can be directed toward the interior of the airbag 108c, while the remaining diffuser holes 446 are directed outwardly away from the interior of the airbag 108c. Orienting the second hose 114b in this manner reduces the amount of gas released back into the airbag 108c from the diffuser holes 446 when the first seam portion 437a is ruptured or released. According to certain embodiments, the second hose 114b can also be attached to the airbag 108c via one or more secondary fasteners 449 (e.g., stitching, clips, or other suitable fasteners) to prevent the second hose 114b from ripping away or separating from the airbag 108c after the first seam portion 437a is released as described in more detail below.

In operation, as in other embodiments described herein, the second inflator 111b is initiated momentarily after deployment of the airbag 108c to inflate the second hose 114b. When the second hose 114b inflates, it releases the first seam portion 437a (e.g., by rupturing or tearing apart the first stitching type 438) to rapidly deflate the airbag 108c. The release of the first seam portion 437b forms an opening (e.g., vent) in the airbag 108c that propagates to the ends of the first seam portion 437a. Accordingly, the length of the first seam portion 437a can affect the rate of deflation and/or amount of venting of the airbag 108c. Further, in certain embodiments, the stopper 448 at the end of the third seam portion 442 can prevent further propagation of the opening or vent formed by the first seam portion 437a. For example, if the opening created by the first seam portion 437a continues to propagate past an end portion of the second hose 114b, further propagation is ceased at the stopper 448.

Figure 5A:
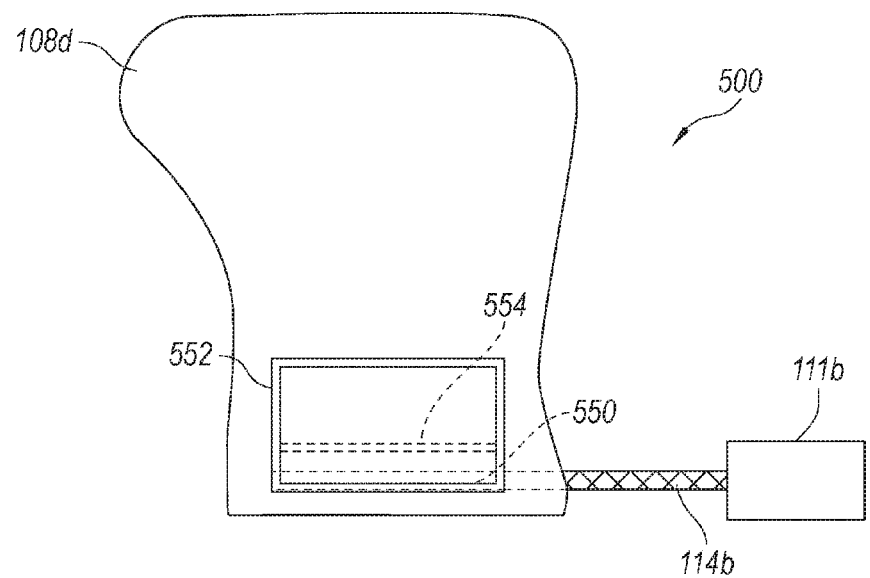
FIG. 5A is a front view of an airbag assembly having an active vent configured in accordance with yet another embodiment of the present technology.
Figure 5B:
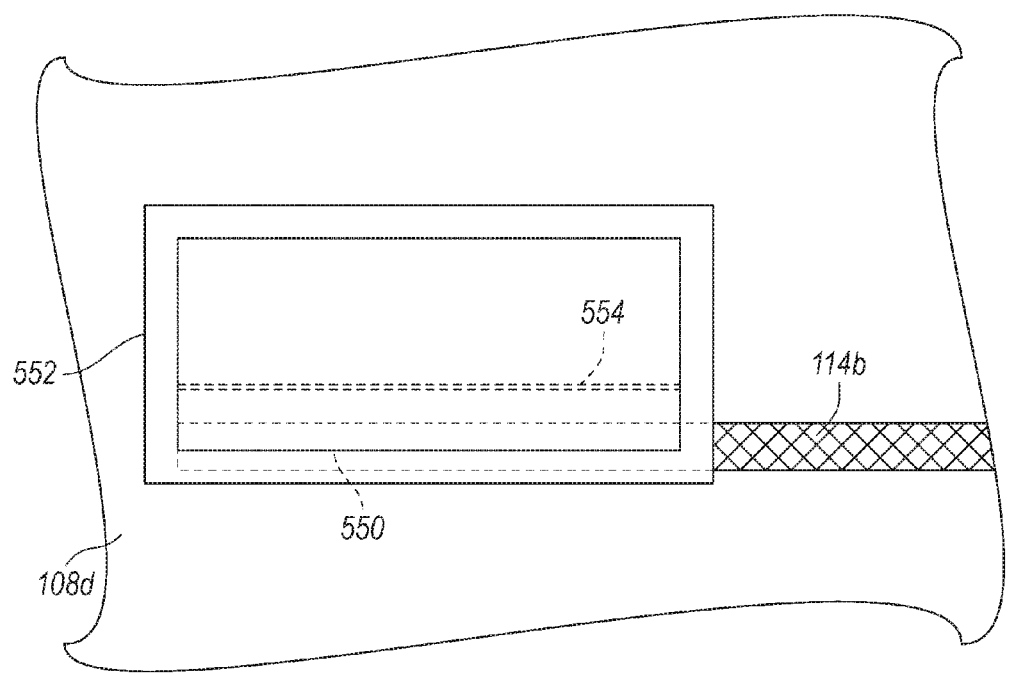
FIG. 5B is an enlarged view taken from FIG. 5A.

FIG. 5A is a front view of an airbag assembly 500 with an airbag 108d configured in accordance with another embodiment of the present technology, and FIG. 5B is an enlarged view of a portion of the airbag 108d taken from FIG. 5A. Although not shown in FIGS. 5A and 5B, the airbag assembly 500 includes a first inflator and a first hose that inflate an airbag 108d upon detection of a crash event (e.g., as described above with respect to FIGS. 1A-4B. Similar to the embodiment illustrated in FIGS. 4A and 4B, the airbag assembly 500 includes only one airbag 108d. Referring first to FIG. 5A, a patch 552 is secured to the airbag 108d over a vent slit 554 (e.g., an opening) in the airbag 108d to prevent or reduce gas from escaping the airbag 108d through the vent slit 554 during inflation. The second hose 114b is sandwiched between a portion of the patch 552 (e.g., a perimeter portion of the patch 552) and the airbag 108d. The airbag 108d, the perimeter portion of the patch 552, and the second hose 114b can be stitched together along a seam 550 and/or otherwise attached to each other. The airbag assembly 500 illustrated in FIGS. 5A and 5B can include one or more of any of the features with respect to any of the other embodiments described herein, in whole or in part. For example, an end portion of the second hose 114b can be sewn partially shut upstream of one or more diffuser holes to increase the rate of inflation of the second hose 114b and/or allow the use of a relatively smaller second inflator.

Figure 6A:
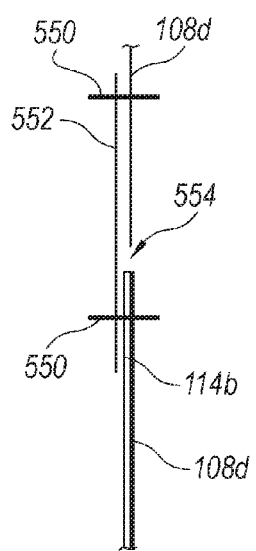
FIGS. 6A-6C are partial side views of various stages of operation of the airbag vent of FIGS. 5A and 5B in accordance with an embodiment of the present technology.
Figure 6B:
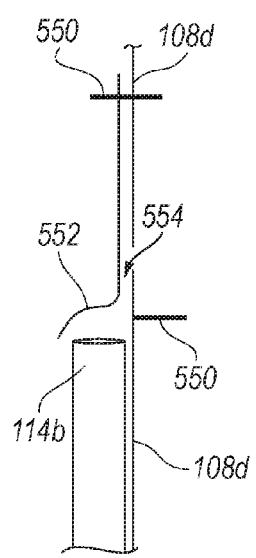
Figure 6C:
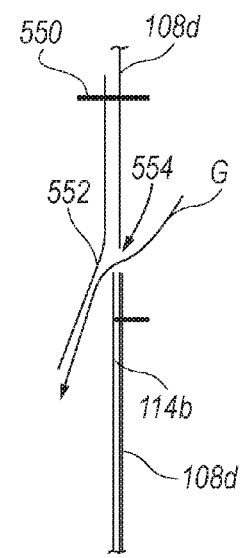

Operation of the airbag assembly 500 of FIGS. 5A and 5B is illustrated in the series of partially schematic side views of FIGS. 6A-6C, which show various stages of inflation of the second hose 114b. As illustrated in FIG. 6A, prior to inflation, the patch 552 is sewn shut over the vent slit 554 to prevent or reduce gas from escaping the airbag 108d through the vent slit 554 during airbag inflation. When the second hose 114b is inflated, as shown in FIG. 6B, the pressure of the expanded second hose 114b ruptures (e.g., tears apart) at least a portion of the seam 550 that attaches the patch 552 to the airbag 108d. Once the seam 550 is released, at least a portion of the patch 552 lifts away from the airbag 108d to allow gas to escape from the vent slit 554 and rapidly deflate airbag 108d (as indicated by arrow G in FIG. 6C). The gas can escape through the vent slit 554 at any time after a portion of the seam 550 has ruptured, including while the second hose 114b is expanding (FIG. 6B) and after the second hose 114b has deflated (FIG. 6C; e.g., after releasing the gas from the second inflator 111b (FIG. 5A)).

Figure 7A:
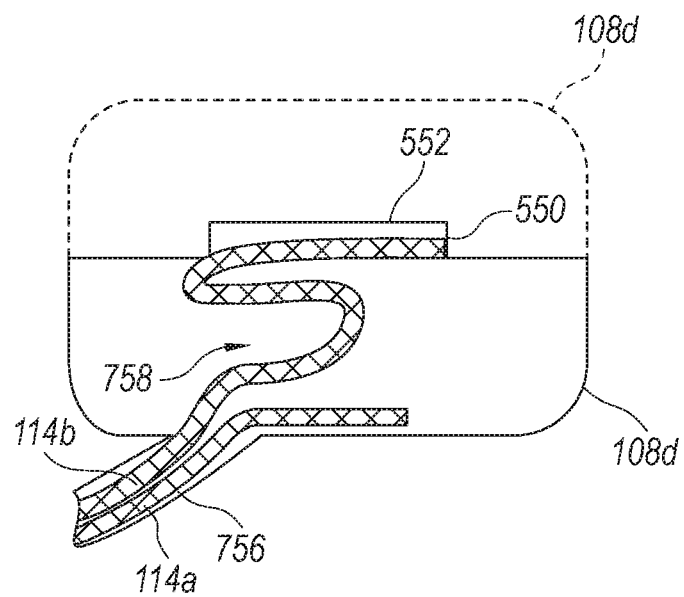
FIGS. 7A and 7B are top cross-sectional views of the airbag assembly of FIGS. 5A and 5B in a stowed configuration and a deployed configuration, respectively, in accordance with an embodiment of the present technology.
Figure 7B:
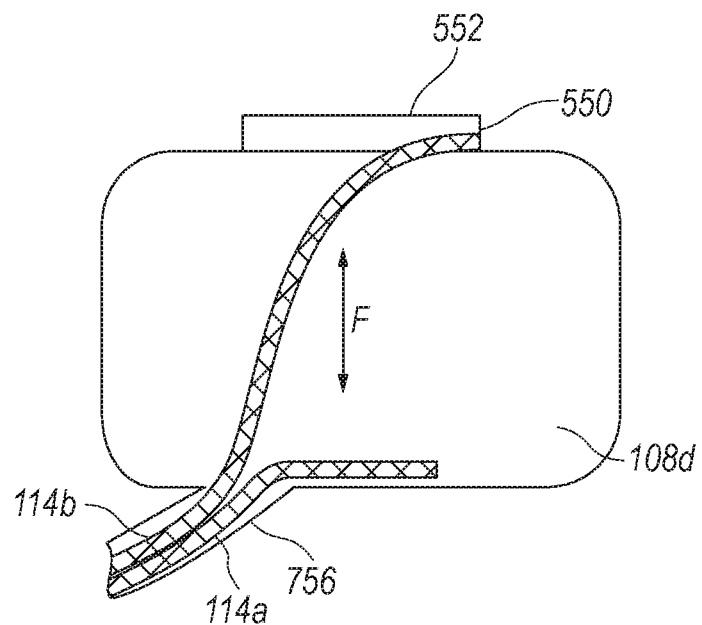

The top cross-sectional views of FIGS. 7A and 7B illustrate the airbag 108d of FIGS. 5A and 5B in stowed and deployed configurations, respectively, according to certain embodiments of the present technology. The broken lines in FIG. 7A indicate the inflated airbag 108d in the deployed configuration. In some embodiments, a deployed length of the second hose 114b can be stowed inside or outside the airbag 108d. For example, as illustrated in FIG. 7A, a fabric tube 756 disposed partially outside the airbag 108d can house a portion of the second hose 114b, and a portion of the second hose 114b can be stored inside the airbag 108d in the stowed configuration with one or more induced bends 758 (e.g., folds or coils). The bends 758 in the portion of the second hose 114b stored inside the airbag 108d enable the second hose 114b to unfold as the airbag 108d deploys without applying unnecessary stress on the seam 550 and/or the second inflator 111b. As shown in FIG. 7B, if the second hose 114b has insufficient slack, the second hose 114b could inadvertently apply a tension force F during, for example, deployment of the airbag 108d. Insufficient slack in the second hose 114b may also apply undue force F during assembly and transportation of the airbag assembly 500. The force F can cause inadvertent tearing of the seam 550 and premature deflation of the airbag 108d. In addition, this may cause the second hose 114b to pull on and initiate the second inflator 111b, causing inadvertent inflation of the second hose 114b. Positioning the second hose 114b within the airbag 108d may also inhibit binding that could occur during deployment of the airbag 108d if the second hose 114b were folded outside of the airbag 108d or within the fabric tube 756.

Figure 8A:
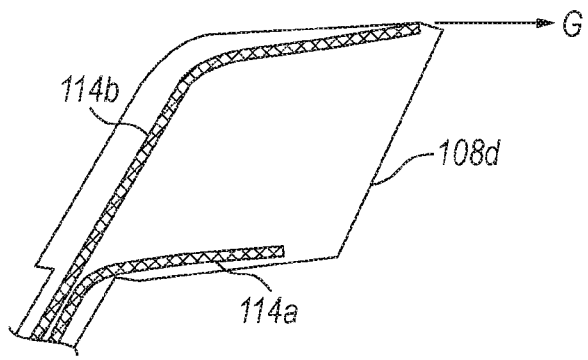
FIGS. 8A-8C are a series of top cross-sectional views illustrating a method of folding and storing an airbag hose in accordance with an embodiment of the present technology.
Figure 8B:
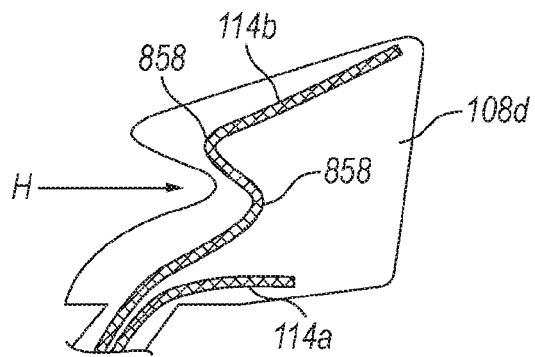
Figure 8C:
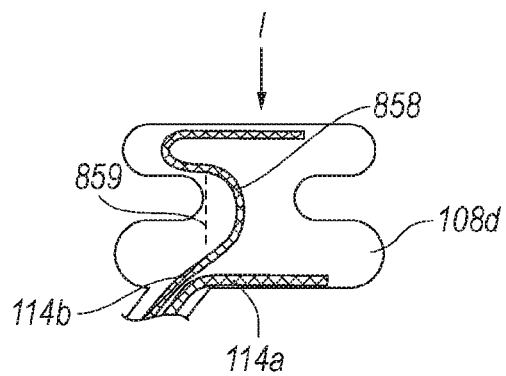

FIGS. 8A-8C are a series of top cross-sectional views illustrating a method of folding and storing the second hose 114b within the airbag 108d of FIGS. 5A and 5B. As illustrated in FIG. 8A, a pulling force in the direction of arrow G can be applied to an end portion of the second hose 114b to pull the second hose 114b into position inside the airbag 108d. As illustrated in FIG. 8B, one or more folds, bends and/or coils 858 can be induced in the second hose 114b and the airbag 108d by pushing a portion of the airbag 108d adjacent to the second hose 114b inwardly in the direction of arrow H. The airbag 108d and the second hose 114b can then be collapsed together with a downward force in the direction of arrow I as shown in FIG. 8C. The airbag 108d is then ready to be further assembled, stowed in a cover, and/or secured to the lap belt 103 (FIG. 1A), a shoulder web, a seat back, a divider wall, a surrounding monument, and/or other structure. Further, in some embodiments, one or more stitches 859 and/or other fasteners can be used to temporarily secure the second hose 114b to itself and maintain the at least one fold, coil and/or bend 858 in the second hose 114b when in the stowed or undeployed configuration. The stitches 859 can be configured to break as the airbag 108d is deployed. This can prevent the second hose 114b from sliding or being pulled out of the airbag 108d and into, for example, the fabric tube 756 prior to deployment of the airbag 108d (e.g., during transportation, assembly, and/or installation of the airbag 108d).

Figure 9A:
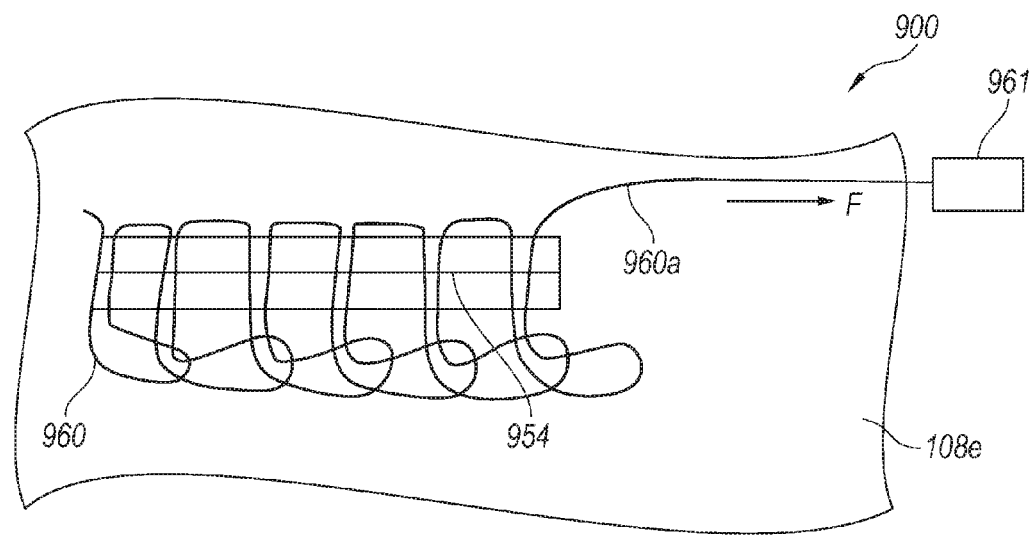
FIG. 9A is an enlarged front view of an airbag vent configured in accordance with an embodiment of the present technology.

FIG. 9A is an enlarged view of a portion of an airbag assembly 900a including an airbag 108e configured in accordance with another embodiment of the present technology. In this embodiment, the airbag 108e can include a vent or seam 954 sewn together by stitching 960 (e.g., a single threaded chain stitch in which only one loop must fail to open the seam 954). The seam 954 is configured to be released without a second inflator, a second hose, and/or a second airbag. The airbag assembly 900a can include a release mechanism 961 (shown schematically) operably coupled an end portion 960a of the stitching 960 to release the seam 954 and, thereby, open the seam 954 to release gas from the airbag 108e. For example, the release mechanism 961 may be a pull cord, a solenoid spool valve, a spring-loaded mechanism, an automatic retractor spool, and/or other suitable mechanical release device attached to an end portion 960a of the stitching 960.

In operation, a single inflator 111a (not shown; FIG. 1A) can be used to inflate the airbag 108e in a conventional manner, and then a pull force F can be applied to a free end portion 960a of the stitching 960 by the release mechanism 961 that extends outside the airbag 108e. This causes the stitching 960 to unravel and/or rupture and release the seam 954 to rapidly deflate the airbag 108e after initial deployment. The pull force F can be applied by a pull cord or other mechanical device attached to the end portion of the stitching 960. The release mechanism 961 can be operably coupled to the electronics assembly 112 (FIG. 1A) such that the electronics assembly 112 can transmit a signal to, for example, an actuator or other device to activate the release mechanism 961. For example, the signal from the electronics assembly 112 can activate an actuator to release a pull cord or a spring-loaded mechanism to apply force F and release the stitching 960 after inflating the airbag 108e. In some embodiments, a second electronics assembly (not shown) can be configured to transmit a signal to an actuator to activate the pull cord or release a spring-loaded mechanism shortly after a first electronics assembly 112 (FIG. 1A) transmits a signal to inflate the airbag 108e. In other embodiments, the pull force F can be applied by an impact of an occupant against the deployed airbag 108e (e.g., as described in more detail below with respect to the embodiment of FIG. 9B).

Figure 9B:
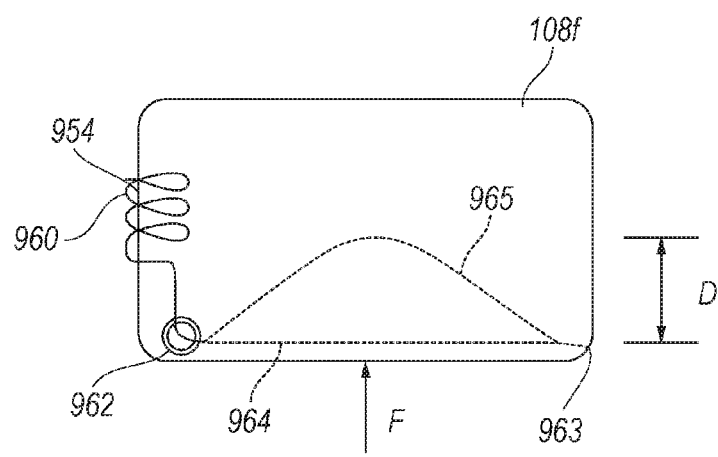
FIG. 9B is a top cross-sectional view of an airbag vent configured in accordance with another embodiment of the present technology.

FIG. 9B is a top cross-sectional view of an airbag assembly 900b including an airbag 108f that is at least substantially similar to the airbag 108e of FIG. 9A. A portion 964 of the thread from the stitching 960 (e.g., the portion that is not holding the seam 954 closed) extends away from the seam 954 through an opening 962 (e.g., a cut-out, an eyelet, etc.) on a first side of the airbag 108f. The thread portion 964 is attached (e.g., fixed or secured by stitching 963, other fasteners, etc.) to a second side of the airbag 108f opposite the first side, so that the thread portion 964 extends between the first and second sides across an interior face of the airbag 108f facing or directed towards the occupant 101 (FIG. 1A)). As the occupant 101 (FIG. 1A) impacts and depresses the airbag 108f (e.g., during an accident or other rapid deceleration event), the thread portion 964 is drawn inward in tension (e.g., as indicated by arrow F and the broken lines 965). This causes the stitching 960 to undo or unravel and release the seam 954, as described above. In such embodiments, timing of the venting can be controlled by the amount of slack in the thread portion 964. For example, if the length of the thread portion 964 is increased, the slack is increased requiring an increased displacement D in the direction of arrow F to release the seam 954 relative to a shorter length thread portion 964. Accordingly, using longer thread portions 964 results in an increased time interval or period to release the seam 954 after the airbag 108f is deployed as compared to shorter thread portions 964.

Figure 10A:
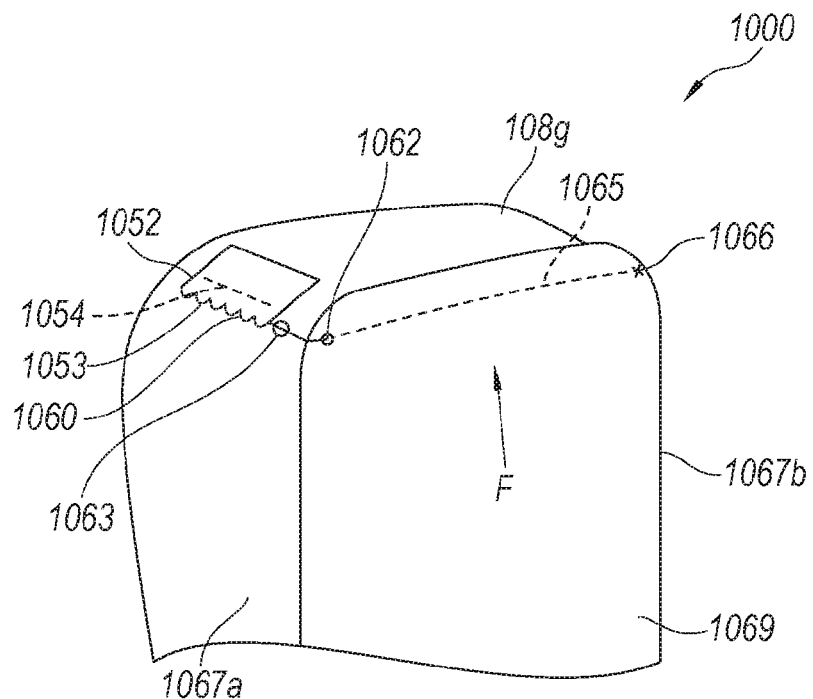
FIG. 10A is a partial isometric view of an airbag assembly having an active vent configured in accordance with another embodiment of the present technology.
Figure 10B:
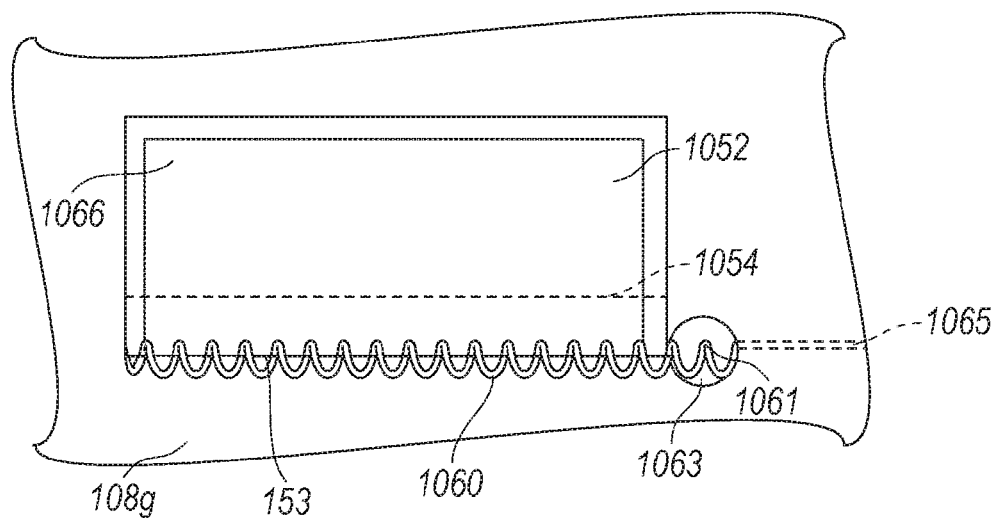
FIG. 10B is an enlarged view taken from FIG. 10A.

FIG. 10A is an isometric view of an airbag assembly 1000 including an airbag 108g configured in accordance with another embodiment of the present technology. FIG. 10B is an enlarged view of a patch 1052 sewn over a vent slit 1054 (e.g., opening) in the airbag 108g of FIG. 10A. This embodiment includes certain features at least substantially similar to the features of the airbag assemblies 900a and 900b of FIGS. 9A and 9B. However, in the embodiment shown in FIGS. 10A and 10B, a first stitching type 1060 (e.g., single thread chain stitches) secures a portion 1053 of the patch 1052 (e.g., a side portion of the patch 1052) over the vent slit 1054 instead of directly sewing a vent seam together (e.g., as in the airbag embodiments of FIGS. 9A and 9B). The first stitching type 1060 can be unraveled to release the portion 1053 of the patch 1052 and expose the vent slit 1054, thereby allowing gas to escape through the vent slit 1054 to rapidly deflate the airbag 108g. As illustrated in FIG. 10B, other side or perimeter portions of the patch 1052 can be secured to the airbag 108g with a second stitching type 1066 (e.g., double needle chain stitches). The second stitching type 1066 keeps the patch 1052 at least partially secured to the airbag 108g after the first stitching type 1060 is unraveled.

Similar to the embodiment illustrated in FIG. 9B, the thread that forms the first stitching type 1060 can include an extension portion 1065 that extends through an opening 1062 (FIG. 10A; e.g., a cut-out or pass-through) on a first side or portion 1067a of the airbag 108g. As shown in FIG. 10A, the thread extension portion 1065 can extend across an interior portion of the airbag 108g and be attached (e.g., fixed or secured) to an attachment point 1066 on a second side or portion 1067a of the airbag 108g opposite the first portion 1067a. After initial airbag inflation, the occupant strikes and compresses a panel 1069 of the airbag 108g (as shown by arrow F in FIG. 10A). This compression of the airbag 108b displaces the thread extension portion 1065 and places the thread extension portion 1065 in tension. The tension on the thread extension portion 1065 pulls and unravels the first stitching type 1060 to release the patch 1052. This allows gas to escape out of the vent slit 1054 to rapidly deflate the airbag 108g.

In other embodiments, the airbag assembly 1000 includes a pull cord or other suitable mechanical release mechanism operably coupled to a free end portion of the first stitching type 1060 that extends outside of the airbag 108g. The release mechanism is activated to pull on the free end portion and unravel the first stitching type 1060 to release the patch 1052.

As illustrated in the enlarged view of FIG. 10B, in some embodiments, the airbag 108g includes a cut-out or opening 1063 in the airbag 108g adjacent or proximate to the patch 1052. The thread extension portion 1065 that extends beyond the patch 1062 includes at least one loop or thread portion 1061 of the first stitching type 1060 that is not attached (e.g., sewn) to the airbag 108g. For example, the thread portion 1061 can extend off of, out of, and/or away from the airbag 108g through the opening 1063, thereby allowing the thread extension 1065 to "float" within the airbag 108g (through the opening 1063) or extend outside the airbag 108g. If the first stitching type 1060 were not arranged with such a free or floating thread portion 1061, the first stitching type 1060 would have to continue to be sewn from the patch 1052 to an edge or side panel or face of the airbag 108g. This could result in a perimeter seam that attaches the airbag material panels together being sewn through the first stitching type 1060 (if the first stitching type continued on the airbag 108g from the patch 1052 to an edge or side portion of the airbag 108g), and may prevent unraveling of the first stitching type 1060 to release the patch 1052. Accordingly, the floating thread portion 1061 removes the possibility of the perimeter stitching interfering with the active vent of the airbag 108g.

In certain embodiments, the thread portion 1061 can be crimped. Crimping the thread portion 1061 can prevent the first stitching type 1060 from being inadvertently pulled and unraveled as the airbag 108g is assembled and/or during deployment. For example, the crimped thread portion 1061 can be configured to withstand (e.g., sufficiently strong to not unravel or release in response to) forces applied during assembly or deployment of the airbag 108g, yet fragile enough to be released or unraveled in response to tension applied to the thread extension 1065 by an occupant striking the airbag 108g or a release mechanism (e.g., pull cord). Any of the features described with reference to the embodiment of FIG. 10B can be applied or included in the airbag assemblies 900a and 900b described above with reference to FIGS. 9A and 9B.

Figure 11:
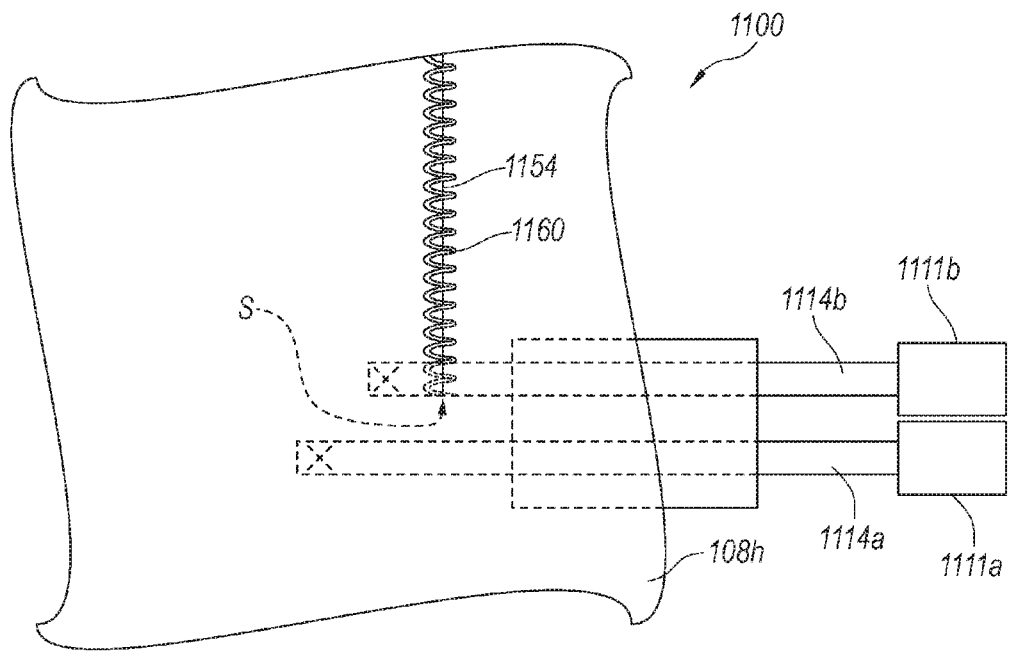
FIG. 11 is a front view of an airbag assembly having an active vent configured in accordance with an additional embodiment of the present technology.
Figure 12:
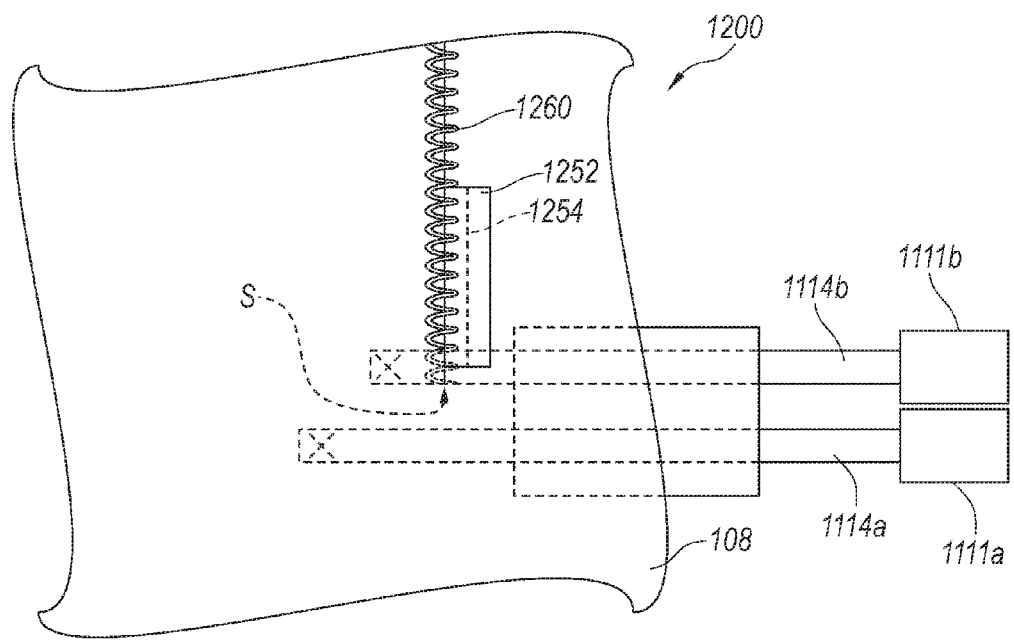
FIG. 12 is a front view of an airbag assembly having an active vent configured in accordance with yet another embodiment of the present technology.

FIGS. 11 and 12 are front views of airbag assemblies 1100 and 1200 including airbags 108h and 108i, respectively, configured in accordance with other embodiments of the present technology. The airbag assemblies 1100 and 1200 of FIGS. 11 and 12 include certain features substantially similar to the features of the airbag assemblies 900a and 900b of FIGS. 9A and 10B, respectively. In the embodiments of FIGS. 11 and 12, however, a second inflator 1111b and a second hose 1114b are configured to directly release a stitched vent seam 1154 (FIG. 11) in the airbag 108h, or release a stitched patch 1252 (FIG. 12) covering a vent 1254 (FIG. 12) on the airbag 108i. Referring to FIG. 11, stitching 1160 (e.g., a chain stitch) sews the vent seam 1154 or other opening closed on the airbag 108h. The stitching 1160 can be sewn to an end portion of the second hose 1114b (as indicated by arrow S), such that the stitching 1160 extends (e.g., starts or originates) from the second hose 1114b (or beyond the second hose 1114b). The stitching 1160 then continues from the second hose 1114b onto the airbag 108h to an end portion of the airbag 108h to sew the vent seam 1154 closed. The stitching 1160 attached to the second hose 1114b is configured to rupture upon inflation of the second hose 1114b to release the stitching 1160 and vent seam 1154. For example, when the second hose 1114b is inflated, internal pressure increases within the second hose 1114b that results in a force being applied on an end portion of the stitching 1160. This force ruptures the stitching 1160 to release the vent seam 1154.

In the airbag assembly 1200 of FIG. 12, the stitching 1260 sews a patch 1252 over the vent 1254. The stitches 1260 can be sewn to the second hose 1114b and ruptured and released upon inflation of the second hose 1114b. This releases at least a portion of the patch 1252 from the airbag 108i, which allows gas to escape from the vent seam 1254 and rapidly deflate the airbag 108i to prevent or reduce occupant rebound.

As described above with respect to FIGS. 10A and 10B, certain embodiments of the present technology may include a crimped end portion of the stitching 1160, 1260 and/or including an opening (not shown) through which the stitching 1160, 1260 can be threaded such that it is spaced apart or off from the airbag to prevent inadvertently releasing the stitching or sewing the stitching to the airbag with perimeter seams. In other embodiments, the airbags assemblies 1100 and 1200 of FIGS. 11 and 12 do not include crimped end portions or additional opening to prevent or reduce the potential for inadvertently releasing the stitching during assembly, construction, and/or deployment of the airbag. For example, referring to FIG. 11, an end portion (e.g., a loop or thread portion) of the stitching 1160 sewn to the second hose 1114b can be sewn to the second hose 1114b, and not secured directly to the airbag 108h. During assembly, the stitching 1160 can first be sewn to the second hose 1114b, and then the second hose 1114b (with the stitching 1160) can then be inserted into the airbag 108h such that a portion of the stitching 1160 attached to the second hose 1114b is free or "floating" within the airbag 108h. Once the second hose 1114b is inserted into the airbag 108h, the other end portion of the stitching 1160 can then continue to be sewn to close the vent seam 1154 or patch 1252 (FIG. 12) and to a portion (e.g., an edge or side portion of a panel or face) of the airbag 108h.

The structure and function of the various airbag systems and/or other associated components described herein can be at least generally similar in structure and function to corresponding systems and components described in U.S. patent application Ser. No. 13/174,659, filed Jun. 30, 2011, now U.S. Pat. No. 9,156,568, and titled INFLATABLE PERSONAL RESTRAINT SYSTEMS; U.S. patent application Ser. No. 09/143,756, filed Aug. 13, 1998, now U.S. Pat. No. 5,984,350, and titled VEHICLE SAFETY SYSTEM; U.S. patent application Ser. No. 10/672,606, filed Sep. 26, 2003, now U.S. Pat. No. 6,957,828, and titled INFLATABLE LAP BELT SAFETY BAG; U.S. patent application Ser. No. 09/253,874, filed Mar. 13, 2000, now U.S. Pat. No. 6,439,600, and titled SELF-CENTERING AIRBAG AND METHOD FOR MANUFACTURING AND TUNING THE SAME; U.S. patent application Ser. No. 09/523,875, filed Mar. 13, 2000, now U.S. Pat. No. 6,535,115, and titled AIR BAG HAVING EXCESSIVE EXTERNAL MAGNETIC FIELD PROTECTION CIRCUITRY; U.S. patent application Ser. No. 09/524,370, filed Mar. 14, 2000, now U.S. Pat. No. 6,217,066, and titled MULTIPLE INFLATOR SAFETY CUSHION; U.S. patent application Ser. No. 12/057,295, filed Mar. 27, 2008, now U.S. Pat. No. 7,665,761, and titled INFLATABLE PERSONAL RESTRAINT SYSTEMS AND ASSOCIATED METHODS OF USE AND MANUFACTURE; U.S. patent application Ser. No. 12/051,768, filed Mar. 19, 2008, now U.S. Pat. No. 7,980,590, and titled INFLATABLE PERSONAL RESTRAINT SYSTEMS HAVING WEB-MOUNTED INFLATORS AND ASSOCIATED METHODS OF USE AND MANUFACTURE; U.S. patent application Ser. No. 13/608,959, filed Sep. 10, 2012, now U.S. Pat. No. 9,176,202, and titled ELECTRONIC MODULE ASSEMBLY FOR INFLATABLE PERSONAL RESTRAINT SYSTEMS AND ASSOCIATED METHODS; U.S. patent application Ser. No. 13/170,079, filed Jun. 27, 2011, now abandoned, and titled SENSORS FOR DETECTING RAPID DECELERATION/ACCELERATION EVENTS; U.S. patent application Ser. No. 13/194,411, filed Jul. 29, 2011, now U.S. Pat. No. 8,439,398, and titled INFLATOR CONNECTORS FOR INFLATABLE PERSONAL RESTRAINTS AND ASSOCIATED SYSTEMS AND METHODS; U.S. patent application Ser. No. 13/227,392, filed Sep. 7, 2011, now U.S. Pat. No. 8,556,293, and titled BUCKLE CONNECTORS FOR INFLATABLE PERSONAL RESTRAINTS AND ASSOCIATED METHODS OF USE AND MANUFACTURE; U.S. patent application Ser. No. 13/086,134, filed Apr. 13, 2011, now U.S. Pat. No. 8,469,397, and titled STITCH PATTERNS FOR RESTRAINT-MOUNTED AIRBAGS AND ASSOCIATED SYSTEMS AND METHODS; U.S. patent application Ser. No. 13/227,382, filed Sep. 7, 2011, now U.S. Pat. No. 8,403,361, and titled ACTIVATION SYSTEMS FOR INFLATABLE PERSONAL RESTRAINT SYSTEMS; U.S. patent application Ser. No. 13/228,333, filed Sep. 8, 2011, now U.S. Pat. No. 8,818,759, and titled COMPUTER SYSTEM FOR REMOTE TESTING OF INFLATABLE PERSONAL RESTRAINT SYSTEMS; U.S. patent application Ser. No. 13/424,197, filed Mar. 19, 2012, now U.S. Pat. No. 8,523,220, and titled STRUCTURE MOUNTED AIRBAG ASSEMBLIES AND ASSOCIATED SYSTEMS AND METHODS; U.S. Provisional Patent Application No. 62/041,549, filed Aug. 25, 2014, and titled AIRBAG ASSEMBLY FOR LEG FLAIL PROTECTION AND ASSOCIATED SYSTEMS AND METHODS; U.S. patent application Ser. No. 14/808,983, filed Jul. 24, 2015, and titled AIRBAG ASSEMBLY FOR LEG FLAIL PROTECTION AND ASSOCIATED SYSTEMS AND METHODS; U.S. patent application Ser. No. 14/505,277, filed Oct. 2, 2014, and titled ACTIVE POSITIONING AIRBAG ASSEMBLY AND ASSOCIATED SYSTEMS AND METHODS; U.S. Provisional Patent Application No. 62/139,684, filed Mar. 28, 2015, and titled EXTENDING PASS-THROUGH AIRBAG OCCUPANT RESTRAINT SYSTEMS, AND ASSOCIATED SYSTEMS AND METHODS; U.S. Provisional Patent Application No. 62/146,268, filed Apr. 11, 2015, and titled ACTIVE AIRBAG VENT SYSTEM; U.S. patent application Ser. No. 15/002,237, filed Jan. 20, 2016, and titled OCCUPANT RESTRAINT SYSTEMS HAVING EXTENDING RESTRAINTS, AND ASSOCIATED SYSTEMS AND METHODS; U.S. Provisional Patent Application No. 62/289,761, filed Feb. 1, 2016, and titled SEAT BELT AIRBAG WITH HEAD PILLOW; and U.S. Provisional Patent Application No. 62/292,642, filed Feb. 8, 2016, and titled MULTI-CHAMBER AIRBAG; and each of the patents and patent applications listed above is incorporated herein by reference in its entirety. Indeed, any patents and applications and other references identified herein, including any that may be listed in accompanying filing papers, are incorporated herein by reference in their entirety. Aspects of the invention can be modified, if necessary, to employ the systems, functions, and concepts of the various references described above to provide yet further implementations of the invention.

From the foregoing, it will be appreciated that specific embodiments of the invention have been described herein for purposes of illustration, but that various modifications may be made without deviating from the scope of the invention. For example, pyrotechnic or other electromechanical cutting devices can be used to cut open or release stitching, seams, patches and/or vents as described herein. Accordingly, the invention is not limited except as by the appended claims.

We claim:

1. An active vent airbag system, comprising:
an airbag having an active vent;
a first inflator;
a second inflator;
a first hose operably coupling the first inflator to the airbag, wherein initiation of the first inflator releases gas into the airbag from the first inflator via the first hose to inflate the airbag; and
a second hose operably coupling the second inflator to the active vent, wherein the active vent remains closed during initial inflation of the airbag via the first hose, wherein initiation of the second inflator after the initial inflation of the airbag is based on a pressure within the airbag, and wherein the initiation of the second inflator releases gas into the second hose to open the active vent and reduce the pressure within the airbag.

2. The active vent airbag system of claim 1, further comprising:
an electronics assembly communicatively coupled to the first and second inflators, wherein
the electronics assembly is configured to transmit a first signal to the first inflator to initiate the first inflator in response to a dynamic event, and
the electronics assembly is further configured to transmit a second signal to the second inflator to initiate the second inflator based on the pressure within the airbag.

3. The active vent airbag system of claim 1 wherein the airbag is a first airbag, and wherein the active vent airbag system further comprises:
a second airbag within the first airbag, wherein the second hose connects the second inflator to the second airbag to deliver gas from the second inflator to the second airbag when the second inflator is initiated, and wherein the second inflator is configured to overinflate the second airbag; and
a seam sealing a portion of the first airbag and a portion of the second airbag during initial inflation of the first airbag, wherein the seam is configured to rupture upon inflation of the second airbag.

4. An active vent airbag system comprising:
an airbag having an active vent;
a first inflator;
a second inflator;
a first hose operably coupling the first inflator to the airbag, wherein initiation of the first inflator releases gas into the airbag from the first inflator via the first hose to inflate the airbag;
a second hose operably coupling the second inflator to the active vent, wherein the active vent remains closed during initial inflation of the airbag via the first hose, and wherein initiation of the second inflator after initial inflation of the airbag releases gas into the second hose to open the active vent and reduce pressure within the airbag;
an electronics assembly communicatively coupled to the first and second inflators, wherein
the electronics assembly is configured to transmit a first signal to the first inflator to initiate deployment of the airbag, and
the electronics assembly is further configured to transmit a second signal to the second inflator to initiate the second inflator; and
a pressure sensor configured to detect internal pressure of the airbag, wherein the electronics module assembly is configured to transmit the second signal when the internal pressure reaches a predetermined level.

5. A method for venting an airbag, the method comprising:
providing an airbag system, the airbag system including
a first airbag having a first panel and a second panel;
a second airbag within the first airbag and having a third panel; and
a common seam joining the first, second and third panels and sealing the first and second airbags;
detecting a crash event with an electronics assembly of the airbag system;
sending a first signal from the electronics assembly to initiate a first inflator, wherein initiation of the first inflator inflates the first airbag; and
sending a second signal from the electronics assembly to initiate a second inflator, wherein the second signal is transmitted after the first signal, and wherein initiation of the second inflator inflates the second airbag and opens the common seam to reduce pressure within the first airbag.

6. The method of claim 5 wherein the second signal is transmitted after a predetermined time period after the first signal, initiation of the first inflator, the crash event, or deployment of the first airbag.

7. The method of claim 5 wherein the second signal is transmitted after detection of a position of a seat occupant relative to at least one of the first airbag, a seat, or a monument surrounding the seat occupant.

8. A method for venting an airbag, the method comprising:
detecting a crash event with an electronics assembly of an airbag system;
sending a first signal from the electronics assembly to initiate a first inflator, wherein initiation of the first inflator inflates an airbag; and
sending a second signal from the electronics assembly to initiate a second inflator, wherein the second signal is transmitted after the first signal, wherein initiation of the second inflator releases gas into a hose to open a vent and reduce pressure within the airbag, and wherein the second signal is transmitted after detection of an internal pressure within the airbag above a predetermined level.

9. The method of claim 8 wherein the airbag is a first airbag, wherein releasing gas into the hose inflates a second airbag within the first airbag, wherein inflating the second airbag causes the vent to open by rupturing a seam sealing the first and second airbags.

10. An airbag system, comprising:
a first inflator operably coupled to the airbag, wherein initiation of the first inflator releases gas from the first inflator to inflate the airbag; and
a second inflator operably coupled to the active vent, wherein the active vent remains closed during inflation of the airbag, wherein initiation of the second inflator (a) occurs after the initiation of the first inflator, (b) is based on internal pressure of the airbag, and (c) releases gas from the second inflator to open the active vent and reduce the internal pressure within the airbag.

11. The airbag system of claim 10, further comprising:
a first hose operably coupling the first inflator to the airbag, wherein the first hose delivers the gas from the first inflator to the airbag; and
a second hose operably coupling the second inflator to the active vent, wherein the second hose delivers the gas from the second inflator to the active vent.

12. The airbag system of claim 10 wherein the airbag is a first airbag, and wherein the active vent includes a second airbag operably coupled to the second inflator.

13. The airbag system of claim 12 wherein the gas released from the second inflator at least partially ruptures the second airbag to open the active vent.

14. The airbag system of claim 10 wherein the airbag is a first airbag, and wherein the active vent includes a second airbag operably disposed at least partially within the first airbag and operably coupled to the second inflator.

* * * * *